(12) United States Patent
Weiss

(10) Patent No.: US 7,822,288 B2
(45) Date of Patent: Oct. 26, 2010

(54) METHOD AND SYSTEM FOR IMPROVED PROCESSING OF IMAGE DATA

(75) Inventor: Ben Weiss, Carpinteria, CA (US)

(73) Assignee: Shell & Slate Software Corporation, Carpinteria, CA (US)

( * ) Notice: Subject to any disclaimer, the term of this patent is extended or adjusted under 35 U.S.C. 154(b) by 945 days.

(21) Appl. No.: 11/627,040

(22) Filed: Jan. 25, 2007

(65) Prior Publication Data

US 2007/0183682 A1     Aug. 9, 2007

Related U.S. Application Data

(60) Provisional application No. 60/762,218, filed on Jan. 25, 2006.

(51) Int. Cl.
*G06K 9/40* (2006.01)

(52) U.S. Cl. .................................................. 382/262

(58) Field of Classification Search ................... None
See application file for complete search history.

(56) References Cited

U.S. PATENT DOCUMENTS

2004/0223659 A1 *  11/2004  Minai .......................... 382/262

* cited by examiner

*Primary Examiner*—Anand Bhatnagar
*Assistant Examiner*—Randolph Chu
(74) *Attorney, Agent, or Firm*—The Hecker Law Group, PLC

(57) ABSTRACT

The present invention is a method and system for deriving histograms for neighborhoods of pixels in an image that uses subtractive image regions to increase the size of overlapping regions of regions of series of adjacent image pixels to a size equal to the size of a full neighborhood. Each neighborhood (except for a central neighborhood) is viewed as a combination of the central overlapping neighborhood and one or more additional regions, at least one of which comprises a "subtractive" region, and which vary in size depending on the distance of a pixel from the pixel that is the basis for the central neighborhood. The histogram for each neighborhood is derived by adding the histograms of the central neighborhood and the histograms for the relevant additional region or regions, which may have one or more negative element values. The method and system of the invention allows the processing time for implementing a median filter to be improved to approximately the order of log(r), where r is the "radius" of the median filter being applied.

3 Claims, 21 Drawing Sheets

$H_{130}$ | 11 | 15 | 0 | 3 | 12 | 9 | 0 | 2 | 0 | 0 | 0 | 0 | 2 | 5 | 12 | 10 | minus $H_{340}$ | 2 | 0 | 0 | 1 | 2 | 1 | 0 | 0 | 0 | 0 | 0 | 0 | 1 | 1 | 1 | 0 | plus $H_{350}$ | 1 | 4 | 0 | 0 | 3 | 1 | 0 | 0 | 0 | 0 | 0 | 0 | 0 | 0 | 0 | 0 | equals $H_{330}$ | 10 | 19 | 0 | 2 | 13 | 9 | 0 | 2 | 0 | 0 | 0 | 0 | 1 | 4 | 11 | 10 |

Figure 5
(Prior Art)

$H_{1135}$ | 15 | 21 | 0 | 2 | 6 | 7 | 0 | 1 | 0 | 0 | 0 | 0 | 2 | 5 | 12 | 10 | plus $H_{1215}$ | -4 | -6 | 0 | 1 | 6 | 2 | 0 | 1 | 0 | 0 | 0 | 0 | 0 | 0 | 0 | 0 | equals $H_{1115}$ | 11 | 15 | 0 | 3 | 12 | 9 | 0 | 2 | 0 | 0 | 0 | 0 | 2 | 5 | 12 | 10 |

Figure 14

|     |     |     |     |
| --- | --- | --- | --- |
| 440 | 101 | 561 | 94  |
| 206 | 206 | 73  | 805 |
| 19  | 999 | 162 | 310 |
| 440 | 94  | 361 | 123 |

1900

|     |     |     |     |
| --- | --- | --- | --- |
| 11  | 4   | 13  | 2   |
| 7   | 8   | 1   | 14  |
| 0   | 15  | 6   | 9   |
| 12  | 3   | 10  | 5   |

METHOD AND SYSTEM FOR IMPROVED PROCESSING OF IMAGE DATA

CROSS REFERENCE TO RELATED PATENT APPLICATION

This patent application claims the benefit of the filing date of U.S. Provisional Patent Application Ser. No. 60/762,218 filed Jan. 25, 2006 entitled "Fast Median and Bilateral Filtering for Modern Processors" the specification and drawings of which is incorporated by reference herein.

FIELD OF THE INVENTION

This invention relates to the field of image processing, and in particular to a method and system for processing image data using histograms.

BACKGROUND OF THE INVENTION

Digital image processing involves applying changes of some kind to a digital image. One category of image processing is filtering. A "filter" is a process that changes the values pixels in an image based on some criteria. One category of filters is "smoothing" filters. Smoothing filters are generally used to reduce noise and smooth out local image variations. A complement to a smoothing filter is a "sharpening" filter. Sharpening filters are generally used to sharpen and enhance local image variations. Sharpening filters are sometimes implemented using smoothing filters. A smoothing filter is applied to an image. For each pixel, the smoothed value is compared to the original value, and the difference between the smoothed and original pixel is applied in the opposite direction to the original pixel value to obtain a sharpened pixel value. Smoothing filters can also be used for other creative effects, such as, for example, extracting the "texture" of an image. U.S. Pat. No. 6,996,287, entitled "Method and Apparatus for Texture Cloning," discloses methods of using smoothing filters for extracting texture. Two types of smoothing filters are "Gaussian" filters and "median" filters.

FIG. 1 shows a representation of a simple example image 100 made up of a plurality of pixels 105. Each pixel has a value that defines the color and intensity of that pixel. A pixel value may be a single number, or a set of numbers. A triplet of values, one of each of red, green, and blue components ("channels"), is sometimes used. In FIG. 1, a simple, single value is used, ranging from 1 to 16. The values of some of the pixels in the top left corner of image 100 are shown in FIG. 1.

Gaussian and median filters typically modify each pixel in an image by replacing the original value of the pixel with a modified value based on the values of pixels contained in a neighborhood ("kernal") around the pixel in question. A common shape of a neighborhood is a square, though other shapes are sometimes used. The size of the neighborhood is a variable parameter chosen by a user. The parameter is often referred to as the "radius" of the filter, even though the neighborhood is commonly not circular and therefore strictly speaking does not have a radius.

A Gaussian filter replaces the value of a pixel with a weighted average of the pixels in a neighborhood around the pixel, with closer pixels weighted more heavily than more distant pixels according to a Gaussian distribution. A Median filter replaces the value of a pixel with the median value of the pixels in a neighborhood of the pixel.

FIG. 1 shows an example of a square neighborhood 130 of an example pixel 120. Neighborhood 130 extends four pixels in each vertical and horizontal direction from pixel 120. Its "radius" is therefore by convention deemed to be four. Each side of neighborhood 130 is nine pixels in length, and the total number of pixels in the neighborhood is 81. In the general case of a square neighborhood of radius r, each side of the neighborhood is $2r+1$ pixels in length, and the number of pixels in the neighborhood is $(2r+1)^2$.

In the example of FIG. 1, values in a range of 1 to 16 are shown for each of the 81 pixels in neighborhood 130. Several methods can be used to determine the median value of the pixels in neighborhood 130. One method is to arrange all the pixel values in order from lowest to highest, and to then identify the value of the pixel for which an equal number of pixels have a higher or lower value.

Another method is to construct a histogram of the pixel values in neighborhood 130. In the embodiment of FIG. 1, there are 16 possible pixel values, namely the whole numbers from 1 to 16. A histogram for the image of FIG. 1 will therefore have 16 elements, or "buckets," one for each possible pixel value. The histogram for neighborhood 130 may be constructed by sequentially traversing the pixels in neighborhood 130, determining the value of each pixel, incrementing the histogram "bucket" for that value by one, and then moving onto the next pixel. Table 1 shows the resulting histogram for neighborhood 130 of FIG. 1.

TABLE 1

Histogram for Neighborhood 130 of FIG. 1

| Pixel Value | Number of Pixels |
| --- | --- |
| 1 | 11 |
| 2 | 15 |
| 3 | 0 |
| 4 | 3 |
| 5 | 12 |
| 6 | 9 |
| 7 | 0 |
| 8 | 2 |
| 9 | 0 |
| 10 | 0 |
| 11 | 0 |
| 12 | 0 |
| 13 | 2 |
| 14 | 5 |
| 15 | 12 |
| 16 | 10 |

The median is found by adding the number of pixels for each of the elements ("buckets") of the histogram, from lowest pixel value (i.e. 1) to highest, until the sum is greater than or equal to $n/2+1$, where n is the number of pixels in the neighborhood (i.e. $[(2r+1)^2/2+1]$ with $r=4$, or 41, for neighborhood 130). Using the histogram numbers from Table 1, the first element for which the sum of the number of pixel in successive elements is greater than or equal to 41 is element "5" ($11+15+0+3+12=41$). The median value of the pixels in neighborhood 130 is therefore "5". Accordingly, in applying a median filter of radius 4 to the image of FIG. 1, the original value of "16" for pixel value 120 is replaced with the median value "5" of neighborhood 130. FIG. 2 shows the filtered image 200 that is constructed by applying a median filter of radius 4 to image 100 of FIG. 1. In FIG. 2, the original value of "16" for pixel 120 has been replaced with the filtered, median value "5." To complete filtered image 200, filtered pixel values must be determined for the remaining pixels in FIG. 100.

FIG. 3 shows the neighborhood 330 that is used to determine the filtered value for pixel 320, which is the next pixel adjacent to pixel 120 in a vertically downwards direction. The terms "vertical" and "horizontal" are used herein as a convenient way to refer to direction in the images in the drawing figures, Those of skill in the art will understand that an image can be oriented any way, so that "vertical" and "horizontal" do not refer to absolute directions, but serve as a means to differentiate between vertical "columns" and horizontal "rows" of pixels in a raster image.

To determine the filtered value for pixel 320, a histogram for neighborhood 330 can be constructed in the same manner the histogram of Table 1 was constructed for neighborhood 130 of pixel 120 in FIG. 1. Table 2 shows the resulting histogram for neighborhood 330 of FIG. 2.

TABLE 2

Histogram for Neighborhood 330 of FIG. 3

| Pixel Value | Number of Pixels |
|---|---|
| 1 | 10 |
| 2 | 19 |
| 3 | 0 |
| 4 | 2 |
| 5 | 13 |
| 6 | 9 |
| 7 | 0 |
| 8 | 2 |
| 9 | 0 |
| 10 | 0 |
| 11 | 0 |
| 12 | 0 |
| 13 | 1 |
| 14 | 4 |
| 15 | 11 |
| 16 | 10 |

Sequentially adding the numbers for each element in the histogram of Table 3 until the sum is equal to or greater than 41 again ends at the element corresponding to pixel value "5" (10+19+0+2+13=44). Accordingly, the median filtered value for pixel 320 is "5." FIG. 4 shows this new value for pixel 320 added to the filtered image 200 of Figure Filtered values for the remaining pixels in FIG. 100 can be found in a similar manner as that used to find the filtered values for pixels 120 and 320. That is, the corresponding neighborhood is found, the histogram for the neighborhood is constructed by traversing each pixel in the neighborhood, incrementing the appropriate element of the histogram for each pixel value, and then the histogram is traversed until the sum of histogram elements is greater or equal to 41 (i.e. $[(2r+1)^2/2+1]$). In this process, constructing the histogram for each pixel can be time consuming, requiring a separate operation (namely incrementing the appropriate histogram element) for each pixel in each pixel's respective neighborhood. Because the number of pixels in a square neighborhood of radius r is $(2r+1)^2$, the time required to per pixel to construct the corresponding histogram is of the order of $r^2$. As r gets large (e.g. on the order of 100 or more), the time to construct the histogram, and therefore apply a median filter, becomes unsatisfactorily large.

Fortunately, the distributive property of histograms allows the average time per pixel to be reduced somewhat. The distributive property of histograms is that for any two disjoint (i.e. non-overlapping) regions A and B, the histogram of the union of those two regions is the sum of the histograms for each region. Anotherwords, if $H_A$ is the histogram for region A and $H_B$ is the histogram for region B, the histogram for the combination of A+B is $H_A+H_B$. Similarly, if a region is the result of removing a region B from region A, the histogram for the resulting region A−B is $H_A-H_B$.

In FIG. 3, neighborhood 130 is shown in dotted outline. Comparing neighborhoods 130 and 330, it can be seen that for the most part, the two neighborhoods overlap. The difference between neighborhood 330 and neighborhood 130 is that neighborhood 330 does not include the top row 340 of neighborhood 130, and includes an extra row 350 (i.e. the bottom row of neighborhood 330) that is not included in neighborhood 130

Using the convention that $H_{130}$ is the histogram for neighborhood 130, $H_{330}$ the histogram for neighborhood 330, $H_{340}$ the histogram for row 340, and $H_{350}$ the histogram for neighborhood 350, using the distributive property of histograms, $H_{330}=H_{130}-H_{340}+H_{350}$. Accordingly, once the histogram for neighborhood 130 of pixel 120 has been created, the histogram for the neighborhood 330 of pixel 320 can be calculated using the existing histogram $H_{130}$ for neighborhood 130 and the two small histograms $H_{340}$ and $H_{350}$ for rows 340 and 350, respectively. Because rows 340 and 350 have fewer pixels than neighborhood 330, determining their respective histograms will take fewer operations than determining he histogram for neighborhood 330 from scratch. The number of pixels in rows 340 and 350, collectively, is 2(2r+1)=4r+2. Accordingly, by using the distributive property of histograms, the number of average operations per pixel required to create the histogram for a neighborhood of radius r for that pixel is on the order of r, instead of on the order of $r^2$, a substantial reduction. FIG. 5 illustrates graphically how the histogram for neighborhood 330 is derived from the histograms for neighborhood 130 and rows 340 and 350, respectively In FIG. 5, each histogram is simply represented as a row of 16 boxes, one for each pixel value from 1 to 16, with the box for pixel value "1" being the leftmost box and the box for pixel value "16" being the rightmost box. As shown in FIG. 5, for each pixel value box, if one starts with the value for $H_{130}$, subtracts the value for $H_{340}$, and adds the value for $H_{350}$, the result is the value for $H_{330}$. For example, using the box for the pixel value "1" as an example (i.e. the left-most box in each histogram), the value for $H_{330}$ is 11−2+1=10.

A further optimization for deriving histograms of pixel values in neighborhoods of radius r for adjacent pixels in an image is disclosed in U.S. Pat. No. 7,010,163 entitled "Method and Apparatus for Processing Image Data," issued Mar. 7, 2006 (the '163 patent), assigned to the assignee of the present invention, and incorporated by reference in its entirety herein. The method disclosed in the '163 patent is based on the observation that in addition to there being overlap in the neighborhoods of pixels adjacent to each other in the vertical direction, there is also overlap in the horizontal direction. Accordingly, additional optimization can be obtained by simultaneously deriving histograms for several horizontally adjacent pixels at a time.

FIG. 6 shows an example of the method disclosed in the '163 patent for simultaneously deriving histograms for the neighborhoods for four horizontally adjacent pixels 120, 610, 620 and 630. The corresponding neighborhoods for pixels 120, 610, 620, and 630 are overlapping neighborhoods 130, 615, 625 and 635, respectively. A "sideview" representation of neighborhoods 130, 615, 625 and 635 is shown below image 100 in FIG. 6 to more clearly show how the neighborhoods overlap. In the example of FIG. 6, the neighborhoods are again square neighborhoods of radius 4. The area of overlap is shaded overlap region 650 shown in FIG. 6.

Overlap region 650 is a region that is common to each of neighborhoods 130, 615, 625, and 635. In the embodiment of FIG. 6, overlap region 650 is nine pixels high and six pixels wide. In the more general case, for "r" being the radius of the neighborhood and "N" being the number of horizontally adjacent pixels for which histograms are being simultaneously derived, the height of region 650 is the full vertical dimension of the neighborhood (i.e. 2r+1), while its width is 2r+2−N. There is no overlap if N is greater than or equal to 2r+2. The maximum number for N for which there is any overlap is therefore 2r+1.

FIG. 7 shows separate "top" views of each of neighborhoods 130, 615, 625, and 635 of FIG. 6. As shown in FIG. 7, each neighborhood can be viewed as the combination of overlap region 650 and one or two other additional regions. For example, neighborhood 130 is the combination of overlap region 650 and additional region 710. Neighborhood 615 is the combination of overlap region 650 and additional regions 720*a* and 720*b* (which can be considered a non-contiguous additional region 720). Neighborhood 625 is the combination of overlap region 650 and additional regions 730*a* and 730*b* (which can be considered a non-contiguous additional region 730). Neighborhood 635 is the combination of overlap region 650 and region 635. It will be noted that the width of each of additional regions 710, 720, 730 and 740 is the same: three pixels in the embodiment FIG. 7 in which the radius r is 4 and the number of simultaneously calculated histograms N is 4. In the more general case, the width of each additional region is N−1.

Using the distributive property of histograms, the histogram for each of neighborhoods 130, 615, 625 and 635 can be derived from the histogram for overlap region 650 and the histograms for each of additional regions 710, 720, 730 and 740 (which can be referred to as "partial histograms") as follows:

$H_{130} = H_{650} + H_{710}$ $H_{615} = H_{650} + H_{720}$ $H_{625} = H_{650} + H_{730}$ $H_{635} = H_{650} + H_{740}$

The filtered value for pixels 120, 610, 620 and 630 can then be found by finding the median value of the corresponding histograms $H_{130}$, $H_{615}$, $H_{625}$ and $H_{635}$, as described above.

Once the initial partial histograms $H_{650}$, $H_{710}$, $H_{720}$, $H_{730}$ and $H_{740}$ have been derived, the histograms for the pixels immediately below pixels 120, 610, 620 and 630 can be found using a process similar to that described with respect to FIG. 3. In that manner, four columns of pixels can be traversed using the method used for traversing a single column in the embodiment of FIG. 3, leading to increased efficiency versus using the method of FIG. 3 to traverse on column at a time.

Although it takes more operations to set up the original histograms, that only occurs once per column. Because of the large number of pixels in each column in a typical image being processed, the processing time is dominated by the average time it takes to process each additional pixel after the original histograms have been derived.

It will be recalled that in the embodiment of FIG. 3, deriving a histogram for the next pixel in a column required adding a new 2r+1 wide row of pixels to the existing histogram and subtracting the top 2r+1 wide row of pixels from the histogram. Because the adding and subtracting steps are essentially inverses of each other that require the same number of operations, processing times between histogram derivation processes can be compared by comparing the average number of operations needed to either add or subtract a row of pixels from a histogram.

In the embodiment of FIG. 7, adding a row of pixels to each of histograms $H_{130}$, $H_{615}$, $H_{625}$ and $H_{635}$. is accomplished by adding partial rows of pixels to each of partial histograms $H_{650}$, $H_{710}$, $H_{720}$, $H_{730}$ and $H_{740}$. FIG. 8 shows the various partial rows of pixels that are added to each of histograms $H_{650}$, $H_{710}$, $H_{720}$, $H_{730}$ and $H_{740}$. As shown in FIG. 8, six-pixel wide row 850 is added to the histogram for region 650 ($H_{650}$). Three pixel wide row 810 is added to the histogram for region 710 ($H_{710}$). Two pixel wide row 820*a* and single pixel 820*b* are added to the histogram for region 720 ($H_{720}$). Single pixel 830*a* and two pixel wide row 830*b* are added to the histogram for region 730 ($H_{730}$). Three pixel wide row 840 is added to the histogram for region 740 ($H_{740}$). The adding of a pixel to a histogram is a single operation. Thus, to add a row of pixels to the set of four histograms $H_{130}$, $H_{615}$, $H_{625}$ and $H_{635}$ requires a total of 18 operations (i.e. histogram adjustments): six for histogram $H_{650}$, and three for each of histograms $H_{710}$, $H_{720}$, $H_{730}$ and $H_{740}$. The average number of histogram adjustments per pixel being processed thus is 18/4=4.5, compared to 9 histogram adjustments per pixel for the embodiment of FIG. 3. In the more general case for radius r and N number of simultaneous columns, the average number of histogram adjustments A per pixel is:

$A = [(2r+2−N) + N(N−1)]/N = (2r+2)/N + N − 2$

For a fixed r, solving for minimum A yields N=SQRT(2r+2). Using this value of N for the equation for A yields A=2SQRT(2r+2)−2 (for adding a row of pixels to a histogram) or A=4SQRT(2r+2)−4 (for doing a complete histogram adjustment comprising adding a row to the bottom and subtracting a row from the top). Accordingly, the process of FIGS. 6 through 8 has a computational cost on the order of SQRT(r), compared to the order of r for the process of FIG. 3, and the order of $r^2$ for the basic one histogram per pixel process.

For sufficiently large values of r and N, the '163 patent discloses a further optimization, which is illustrated in FIG. 9. FIG. 9 shows a "side" view of N neighborhoods 900 of N horizontally adjacent pixels 905 with radius r. In the example of FIG. 9, r=13, and N=14. As shown in FIG. 9, in this embodiment, each neighborhood consists of a fully overlapping region 910, a partially overlapping region 920 or 930, and a remaining region 940. Accordingly, the histogram for each neighborhood 900 can be derived by adding three histograms: namely the histogram for fully overlapping region 910, the histogram of either partially overlapping region 920 or 930, and the histogram of remaining region 940. In the embodiment of FIG. 9, there is one overlapping region 910 that is 2r+2−N pixels wide, there are two partially overlapping regions 920 and 930 that are N/2 pixels wide, and there are N remaining regions 940. The number of histogram adjustments to move one pixel downwards is therefore:

$A = [(2r+2−N) + 2(N/2) + N(N/2−1)]/N = (2r+2)/N + N/2 − 1$

FIG. 10 shows an alternative arrangement of overlapping region 1010 and partially overlapping regions 1020, 1030 (comprised of regions 1030*a* and 1030*b*), and 1040 (comprised of regions 1040*a* and 1040*b*) using the method disclosed in the '163 patent.

As will be appreciated by those skilled in the art, the increasing performance from the methods illustrated in FIGS. 3 to 10 comes from deriving methods to take advantage as much as possible of the overlap among neighborhoods of groups of adjacent pixels in an image. Because the resolution and color depth (i.e. the number of bits per pixel) of typical images continues to increase, there continues to be a need for alternative methods to optimize the calculation of histograms for neighborhoods of pixels in an image, both for purposes of applying median filtering to an image and for other image processing purposes.

SUMMARY OF THE INVENTION

The present invention is a method and system for deriving histograms for neighborhoods of pixels in an image that uses subtractive image regions to increase the size of overlapping regions of regions of series of adjacent image pixels to a size equal to the size of a full neighborhood. Each neighborhood (except for a central neighborhood) is viewed as a combination of the central overlapping neighborhood and one or more additional regions, at least one of which comprises a "subtractive" region, and which vary in size depending on the distance of a pixel from the pixel that is the basis for the central neighborhood. The histogram for each neighborhood is derived by adding the histograms of the central neighborhood and the histograms for the relevant additional region or regions, which may have one or more negative element values. The method and system of the invention allows the processing time for implementing a median filter to be improved to approximately the order of log(r), where r is the "radius" of the median filter being applied.

BRIEF DESCRIPTION OF THE DRAWINGS

FIG. 5 illustrates the distributive property of histograms.

FIG. 14 illustrates the distributive property of histograms used for histograms with negative elements.

FIG. 19 illustrates an example of an ordinal transform.

DETAILED DESCRIPTION OF THE INVENTION

The present invention is a method and system for processing of digital images utilizing histograms. In the following description, numerous specific details are set forth to provide a thorough description of the invention. For example, embodiments of the invention are described for applying a median filter to an image. It will be apparent, however, to one skilled in the art, that the present invention is not limited to the specific described embodiments and may be practiced without the specific details described herein. In other instances, well-known features have not been described in detail so as not to obscure the invention.

The present invention utilizes the concept of a "subtractive" region to increase the size of overlapping regions used to derive the histogram of pixel values in neighborhoods of series of adjacent pixels in an image. By doing so, the invention allows optimization of average processing time per pixel for digital imaging processes such as applying a median filter to an image. Certain embodiments of the invention are described in an paper entitled "Fast Median and Bilateral Filtering" by inventor Ben Weiss, attached as Appendix A, which is incorporated in its entirety by reference herein.

Figure 11:
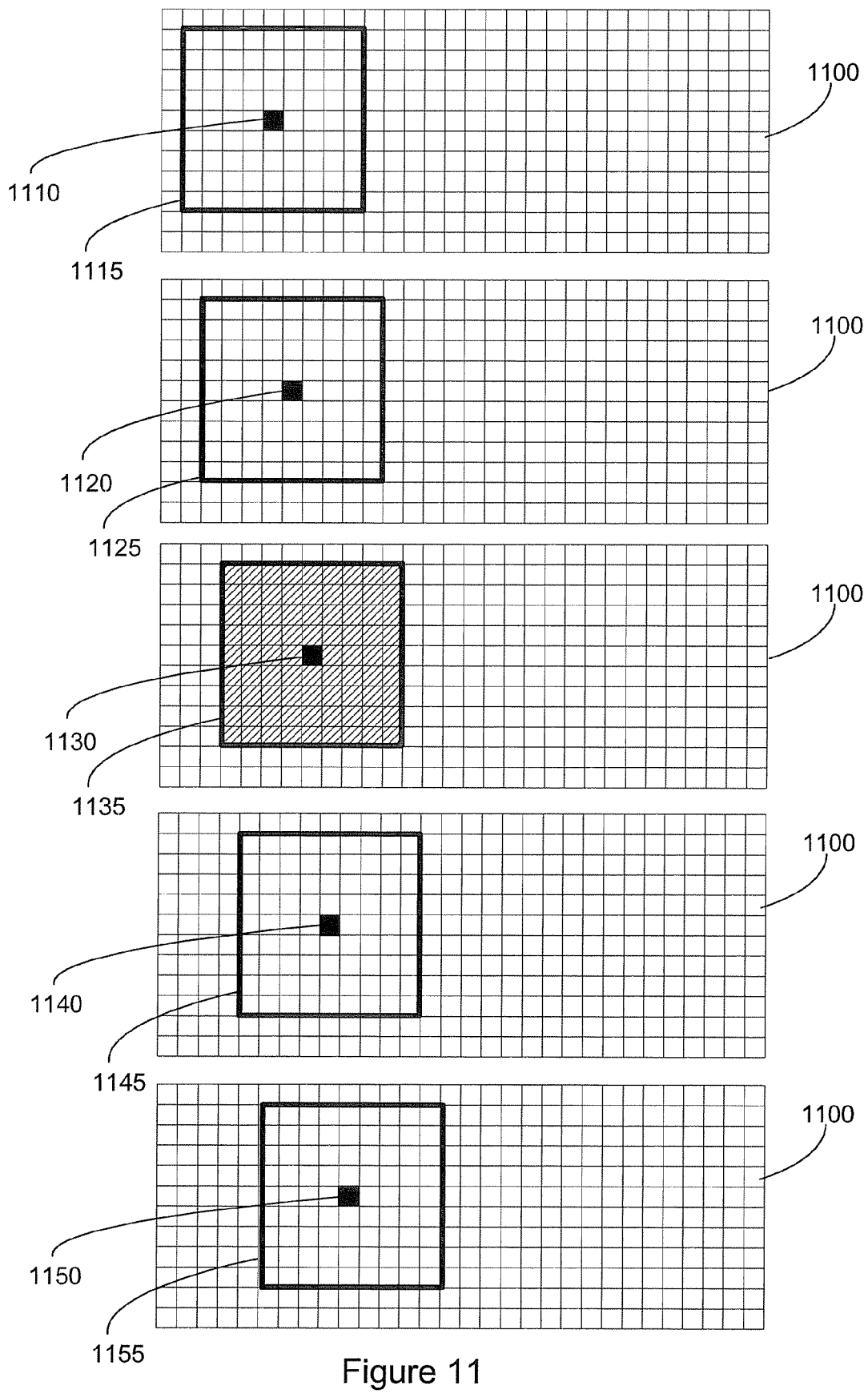
FIG. 11 illustrates a process used to derive histograms for a plurality of pixels in parallel.
Figure 12:
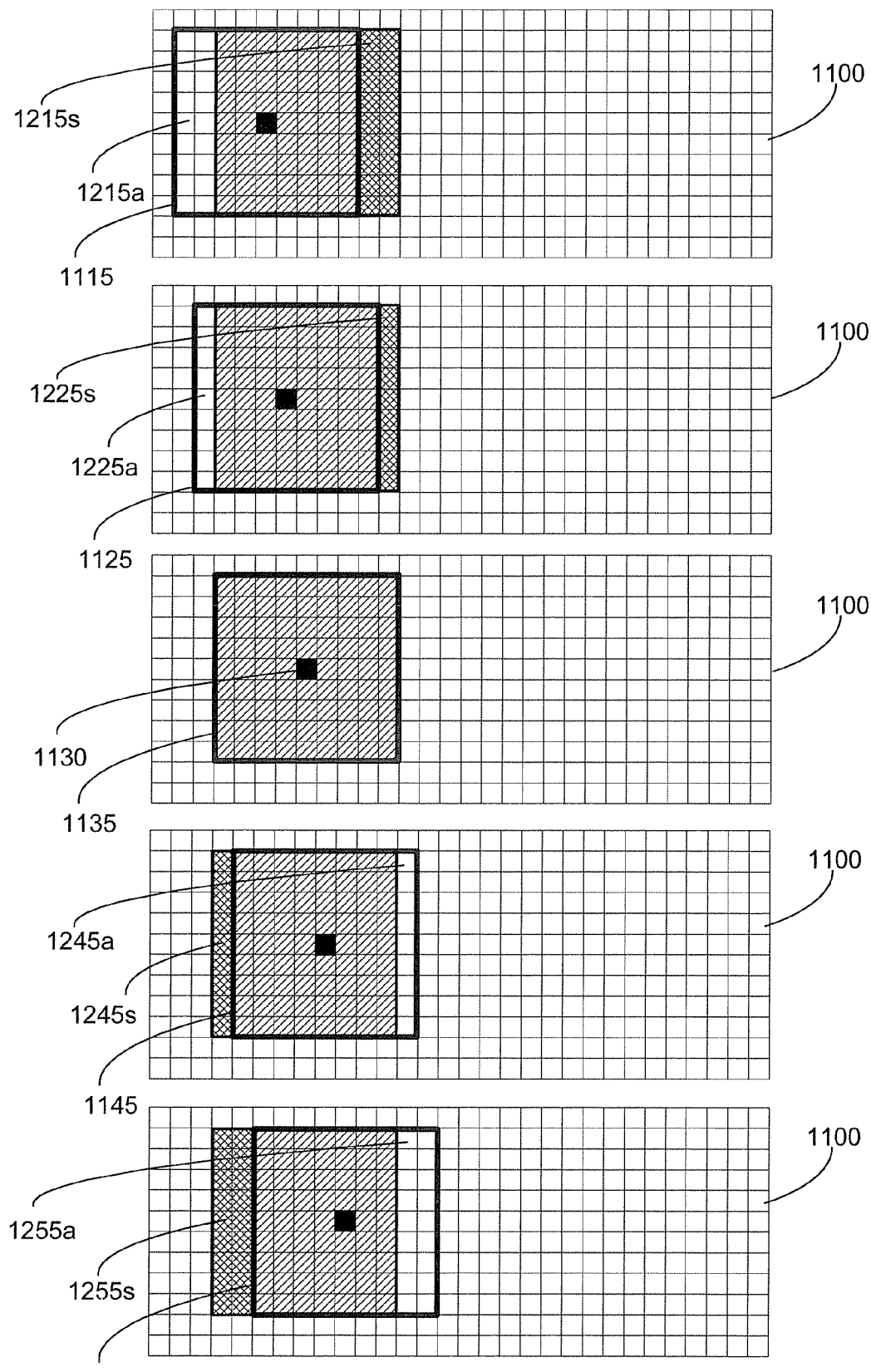
FIG. 12 illustrates a process used to derive histograms for a plurality of pixels in parallel.

FIGS. 11-12 illustrate the concept of a "negative" or "subtractive" image region as used in embodiments of the present invention. FIG. 11 shows neighborhoods 1115, 1125, 1135, 1145 and 1155 of five horizontally adjacent pixels 1110, 1120, 1130, 1140 and 1150, respectively, of a portion of an image 1100. FIG. 12 shows how each of neighborhoods 1115, 1125, 1145 and 1155 can be viewed as the combination of neighborhood 1135 (which is sometimes referred to as the "base" neighborhood) and additional regions 1215, 1225, 1245 and 1255, respectively, which each consist of an additive region (1215a, 1225a, 1245a and 1255a, shown in FIG. 12 with no hatching) and a subtractive region (1215s, 1225s, 1245s and 1255s, shown in FIG. 12 with cross-hatching), respectively. Thus, for example, neighborhood 1115 can be viewed as the combination of base neighborhood 1135, additive region 1215a (which contains the pixels that have to be added to base neighborhood 1135 to obtain neighborhood 1115) and subtractive neighborhood 1215s (which contains the pixels that have to be removed from base neighborhood 1135 to obtain neighborhood 1115). Additive region 1215a and subtractive region 1215s can be considered a single disjoint region 1215 that includes an additive part and a subtractive part.

Using the distributive property of histograms, the histogram for neighborhood 1115 can be derived from the histogram of base neighborhood 1135 and the histogram of additional region 1215. The histogram for base neighborhood 1135 is derived in the normal manner from the pixel values of the pixels in base neighborhood 1135. The histogram for additional region 1215 is obtained by incrementing the corresponding histogram element for the pixel value for each pixel in additive region 1215a and decrementing the corresponding histogram element for the pixel value for each pixel in subtractive region 1215s.

Figure 13:
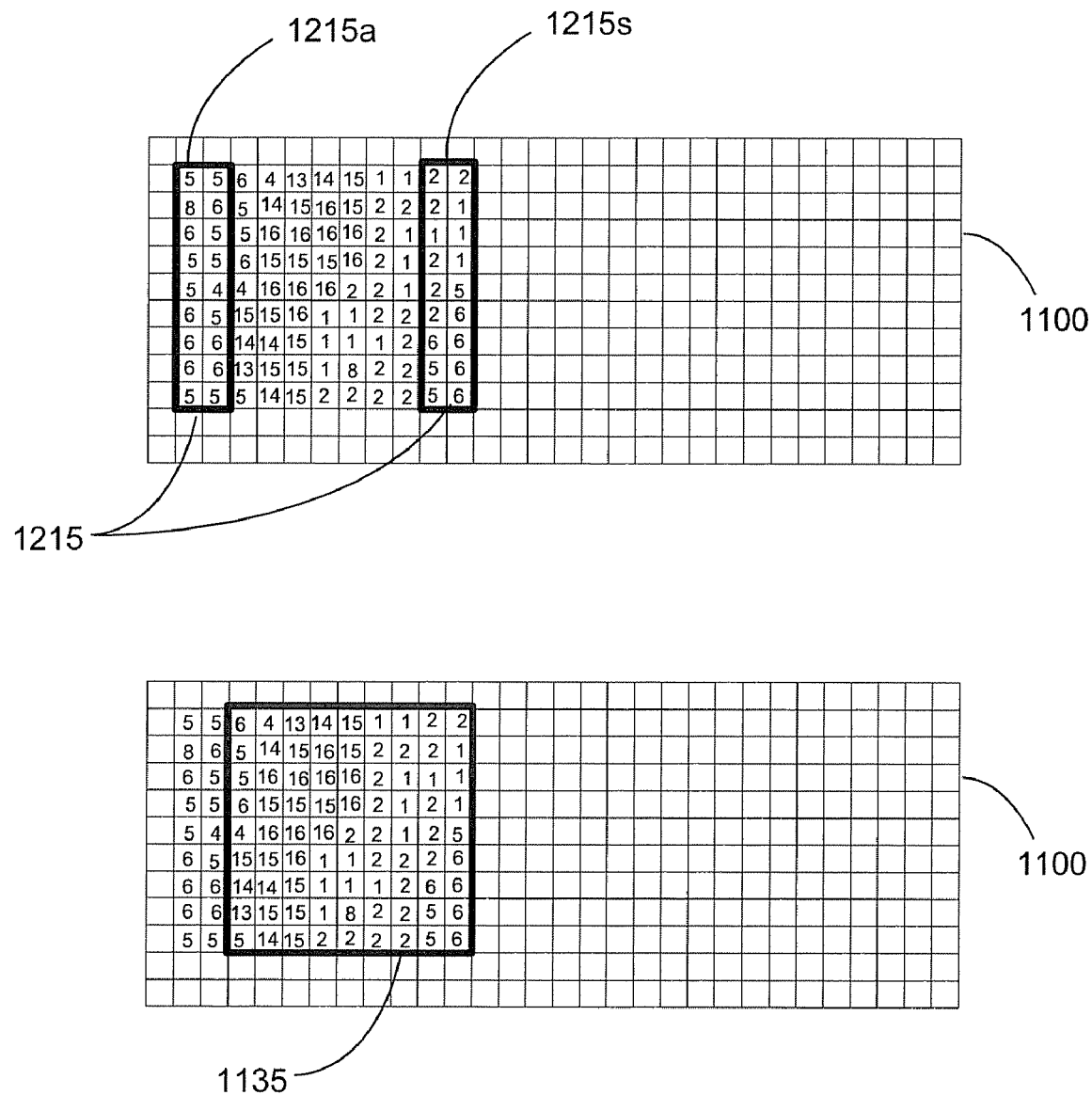
FIG. 13 illustrates a process used to derive histograms for a plurality of pixels in parallel.

FIG. 13 shows some example pixel values for the pixels in base neighborhood 1135 and additional region 1215. FIG. 14 shows how the resulting histograms $H_{1135}$ and $H_{1215}$ are added together to produce the histogram $H_{1115}$ for neighborhood 1115. It will be noted that histogram $H_{1215}$ has negative values for certain elements resulting from the pixel values of the pixels in subtractive region 1215s.

Figure 15:
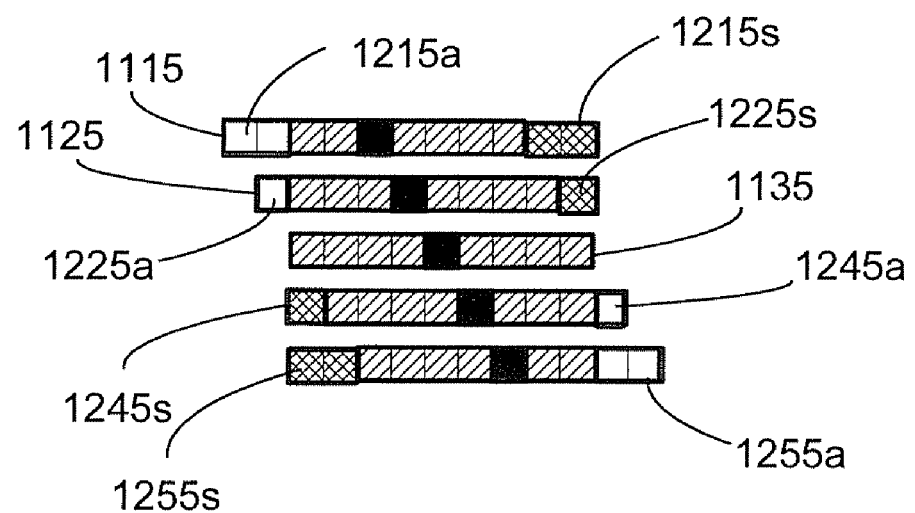
FIG. 15 illustrates a process used to derive histograms for a plurality of pixels in parallel.
Figure 16:
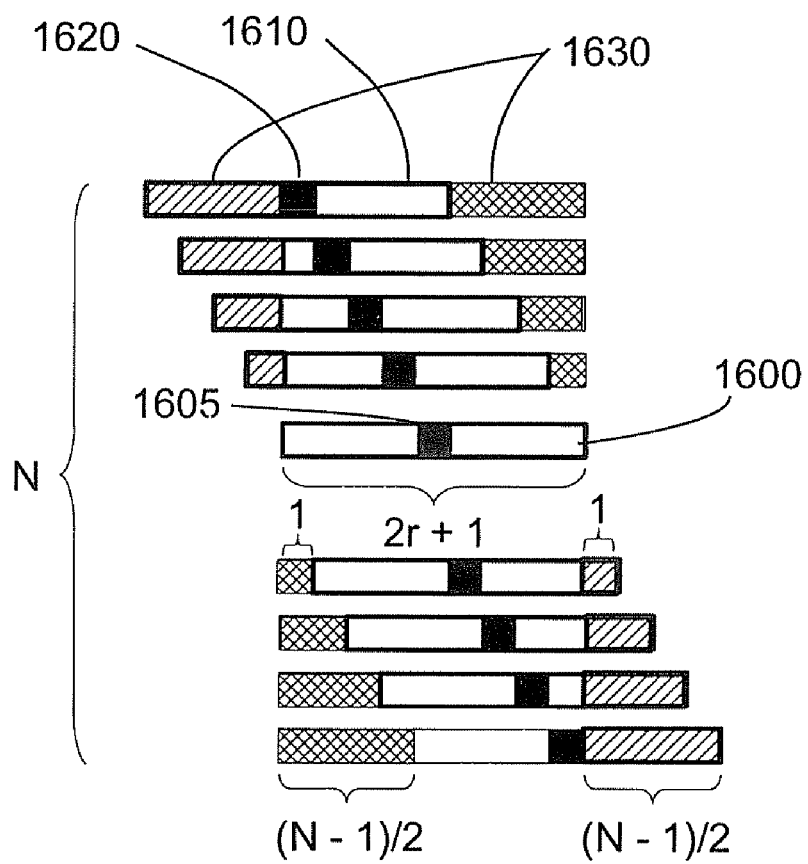
FIG. 16 illustrates a process used to derive histograms for a plurality of pixels in parallel.

FIG. 15 shows a "side" view of the example embodiment of FIG. 12. FIG. 16 shows a side view of a more general embodiment comprising a base neighborhood 1600 of radius r about central pixel 1605 and N−1 neighborhoods 1610 of adjacent pixels 1620, corresponding to operating on a column of pixels N pixels wide, with N typically being an odd integer. Each neighborhood 1610 is the sum of base neighborhood 1600 and the corresponding additional region 1630, each of which comprises an additive region (indicated in FIG. 16 by single hatching) and a subtractive region (indicated in FIG. 16 by cross-hatching)

Figure 1:
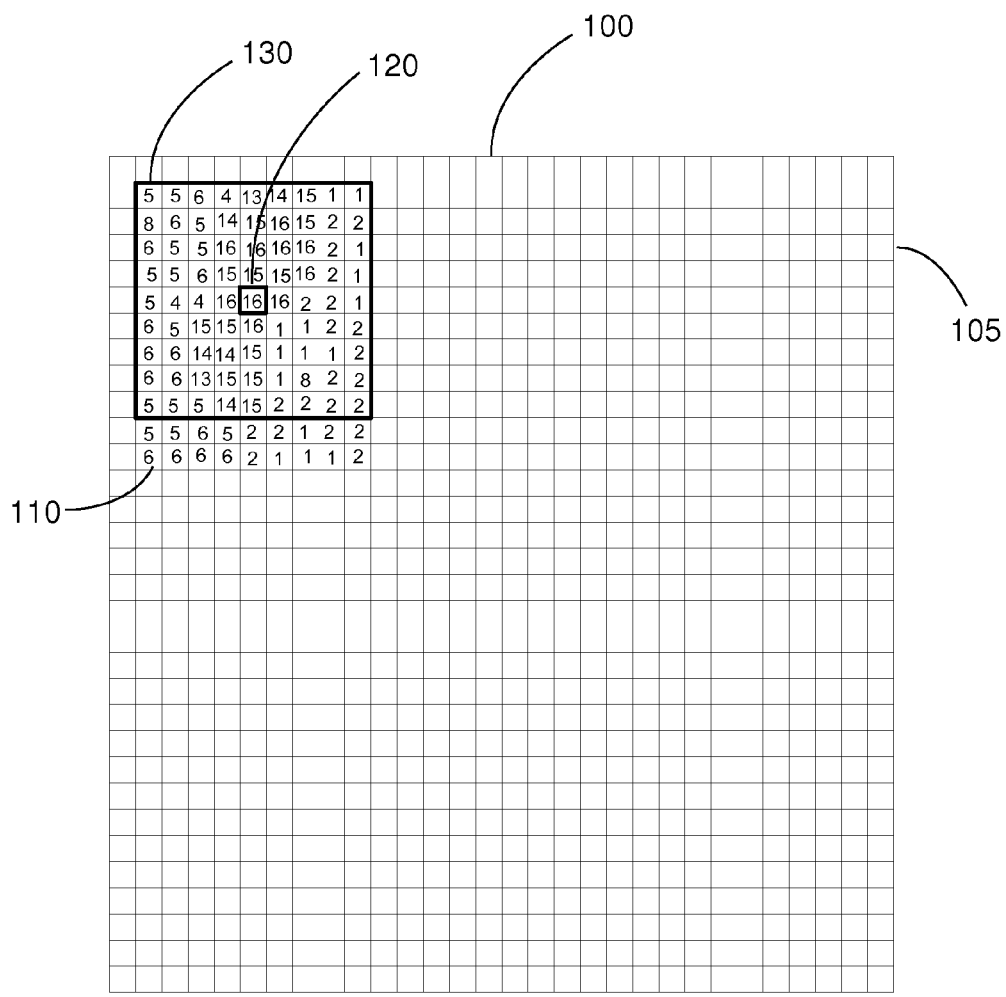
FIG. 1 show an example input image.
Figure 2:
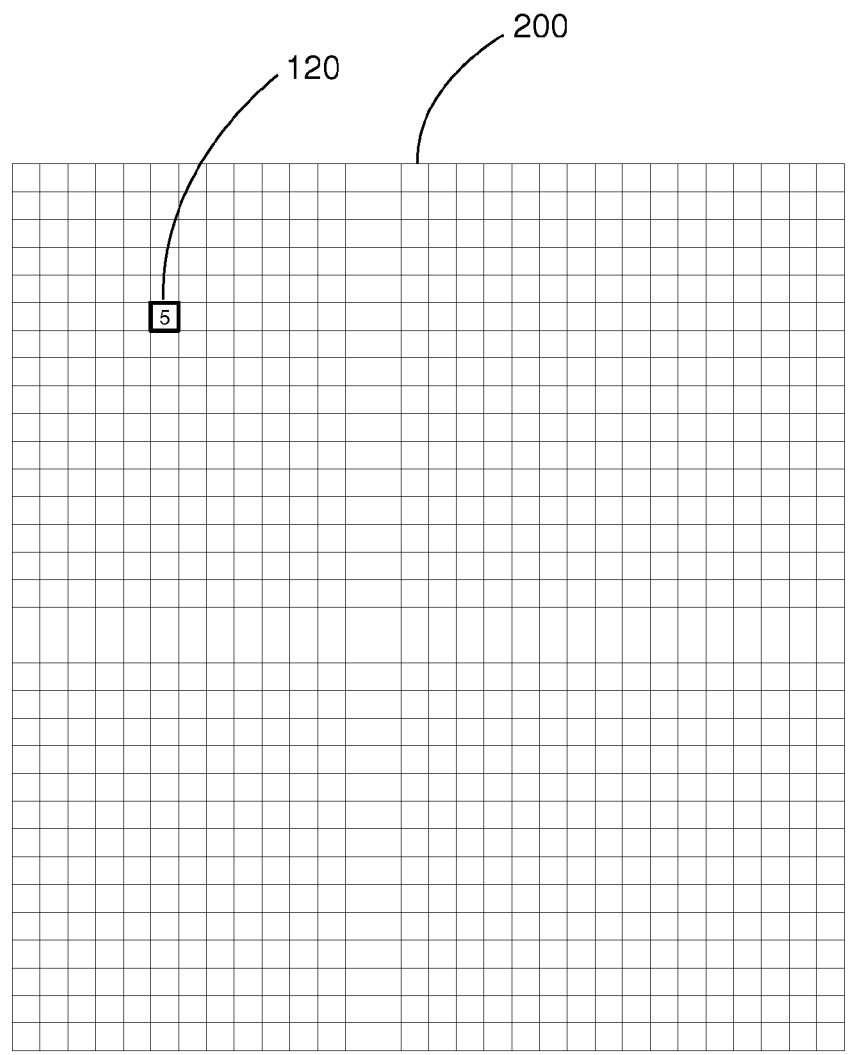
FIG. 2 shows an example output image.
Figure 3:
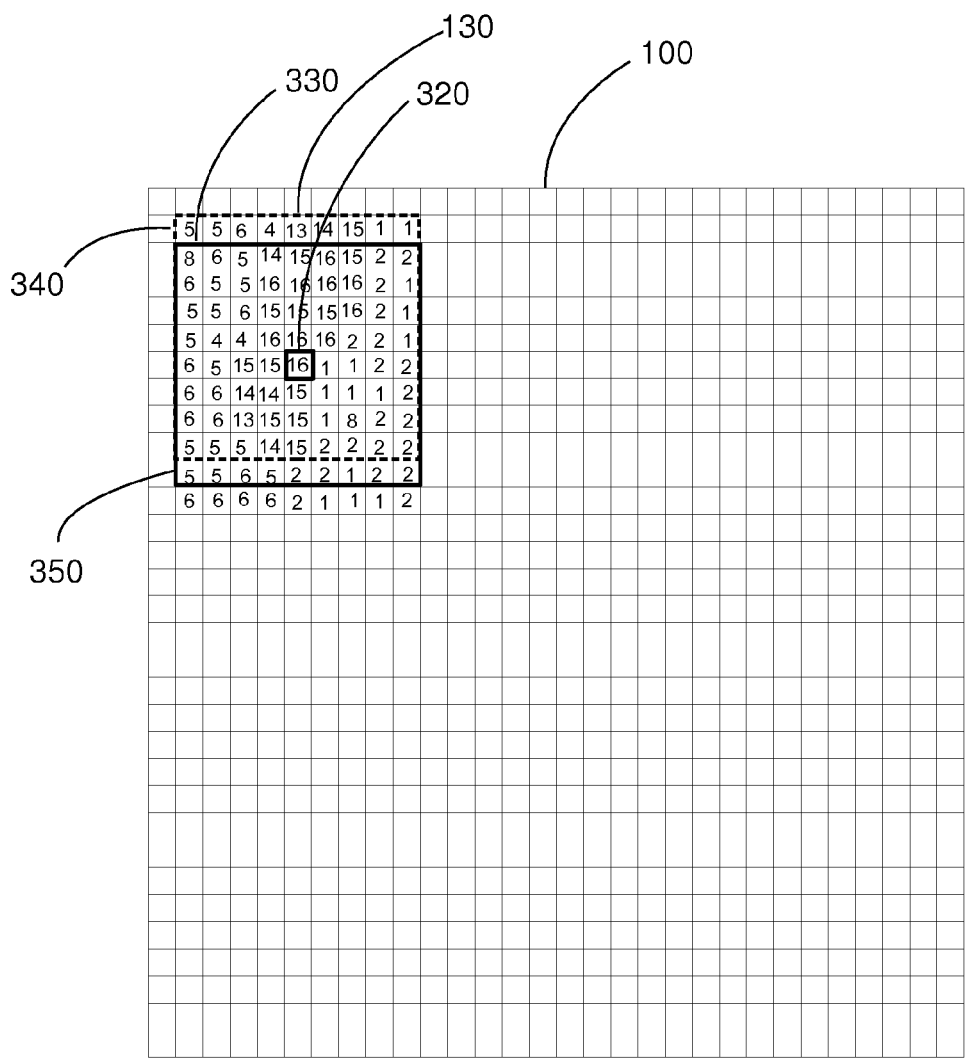
FIG. 3 illustrates adding and subtracting a row of pixels from a neighborhood.
Figure 4:
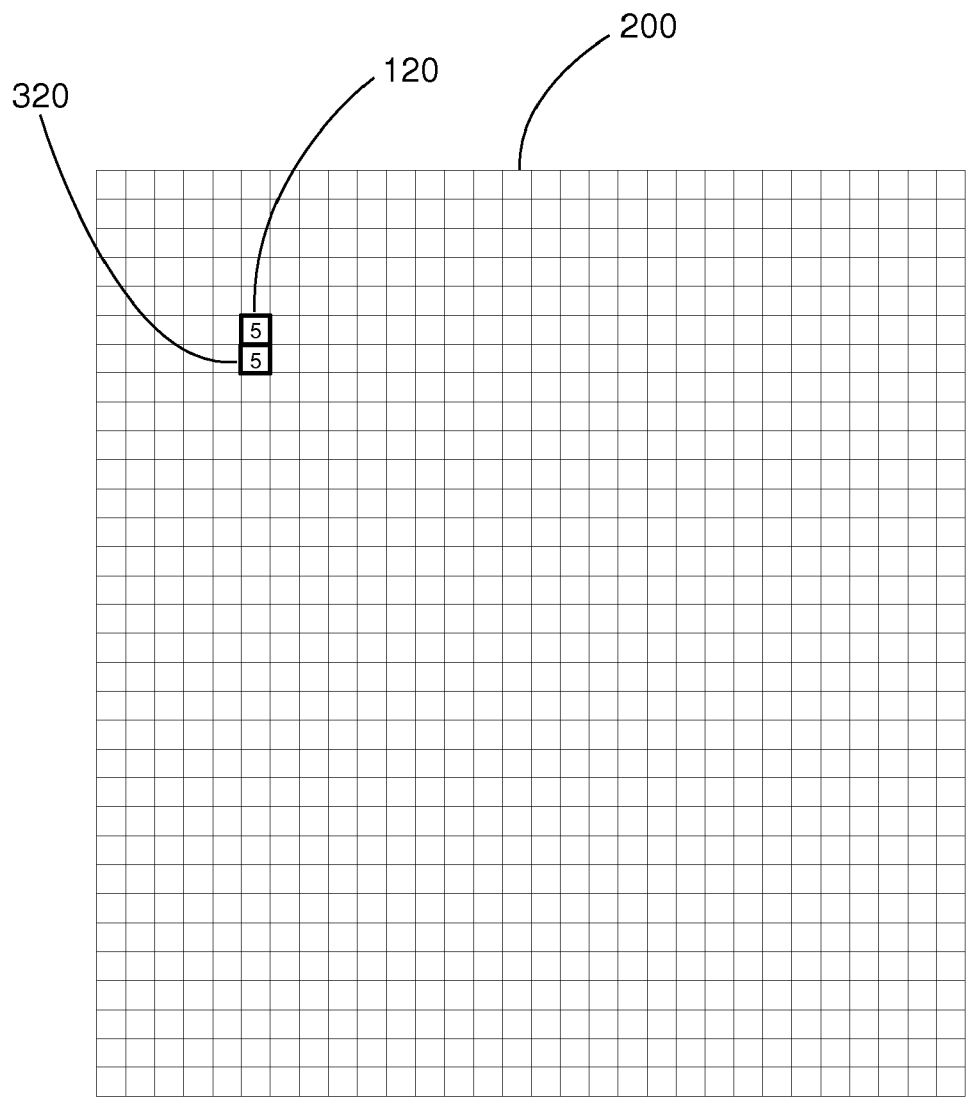
FIG. 4 shows an example output image.
Figure 6:
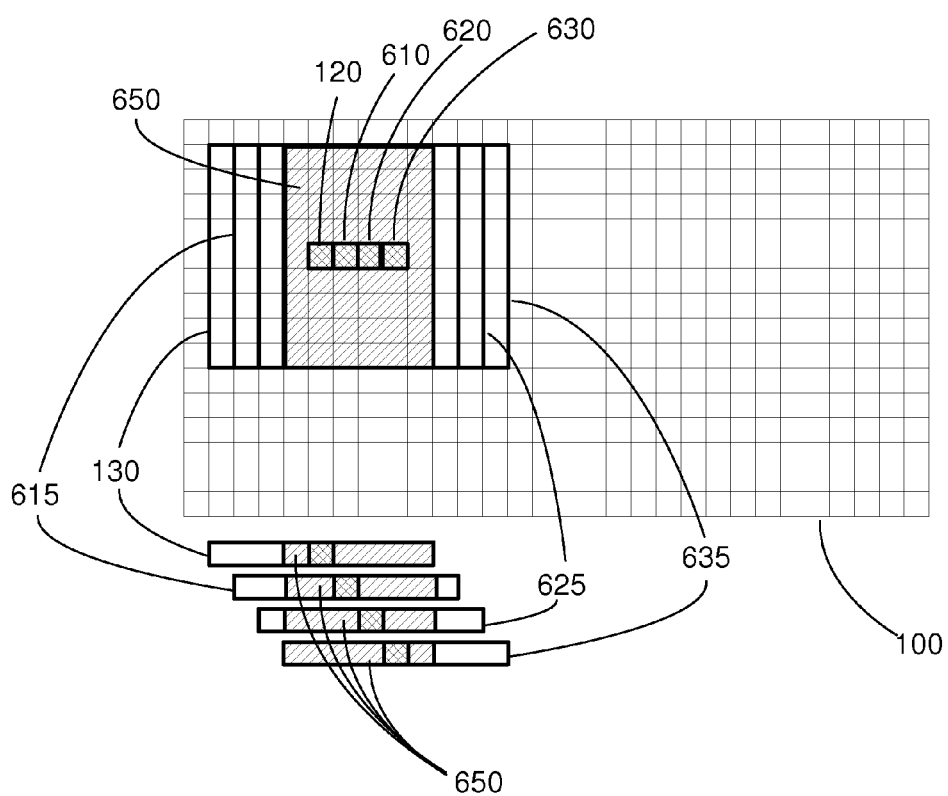
FIG. 6 illustrates a process used to derive histograms for a plurality of pixels in parallel.
Figure 7:
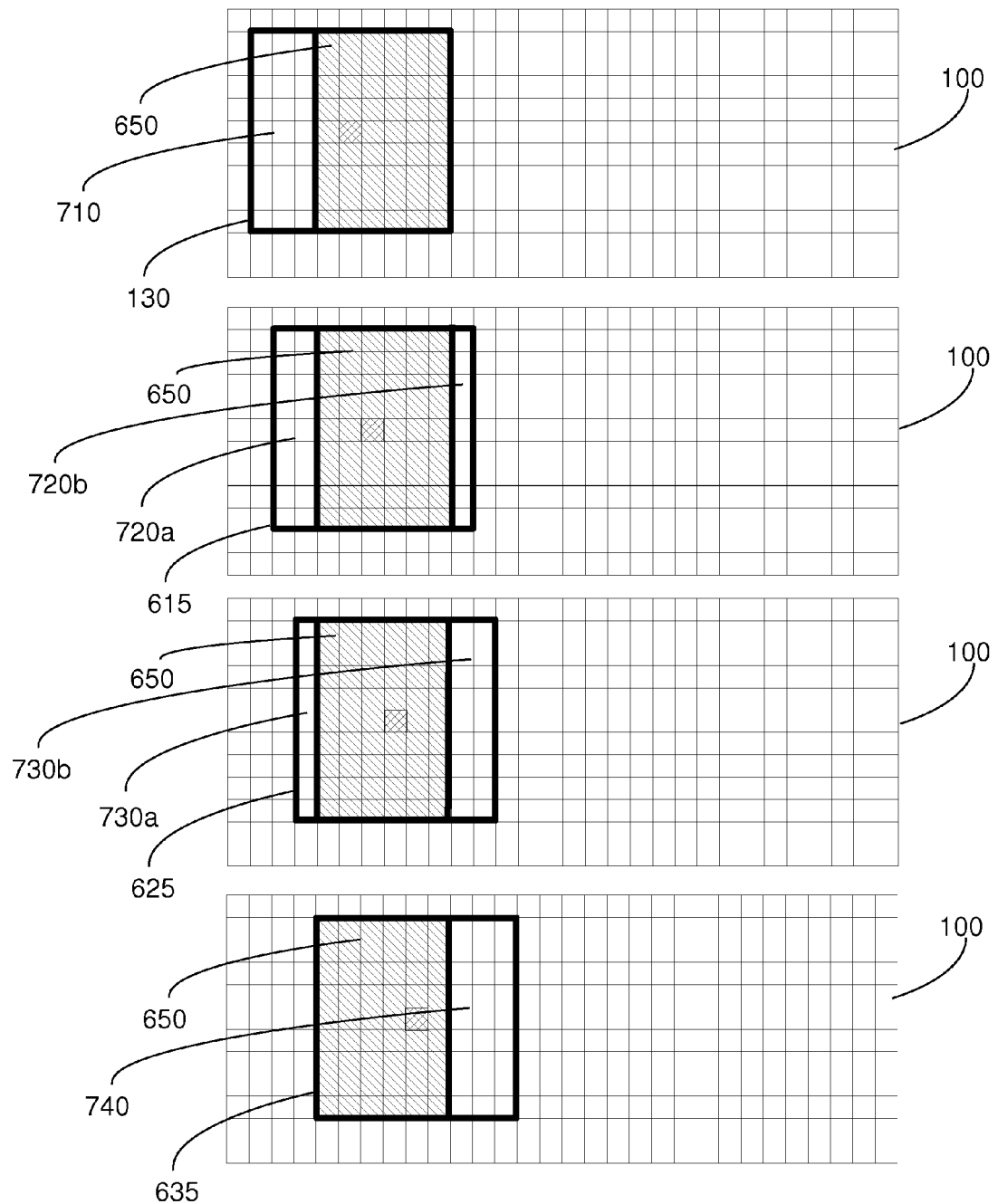
FIG. 7 illustrates a process used to derive histograms for a plurality of pixels in parallel.
Figure 8:
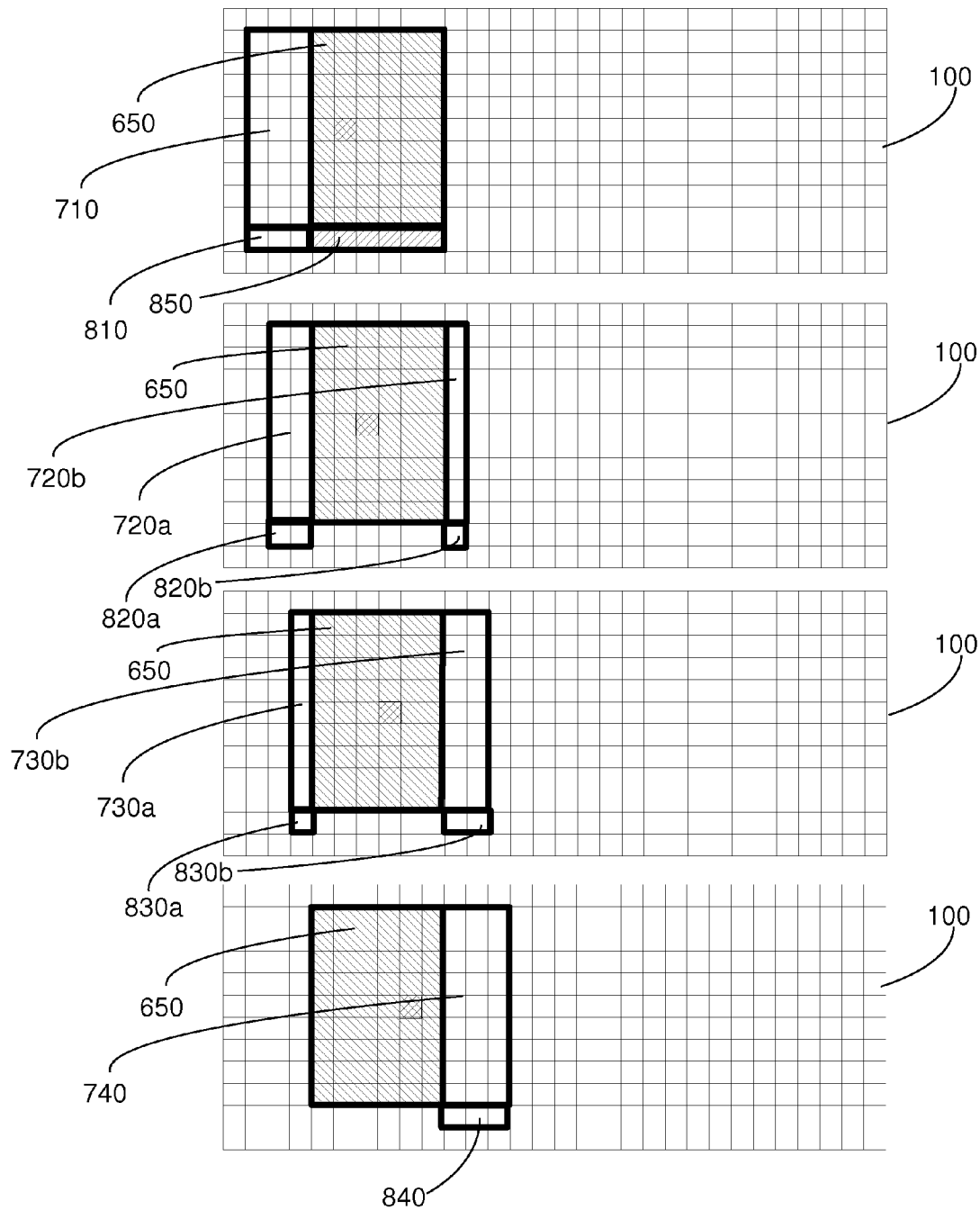
FIG. 8 illustrates a process used to derive histograms for a plurality of pixels in parallel.
Figure 9:
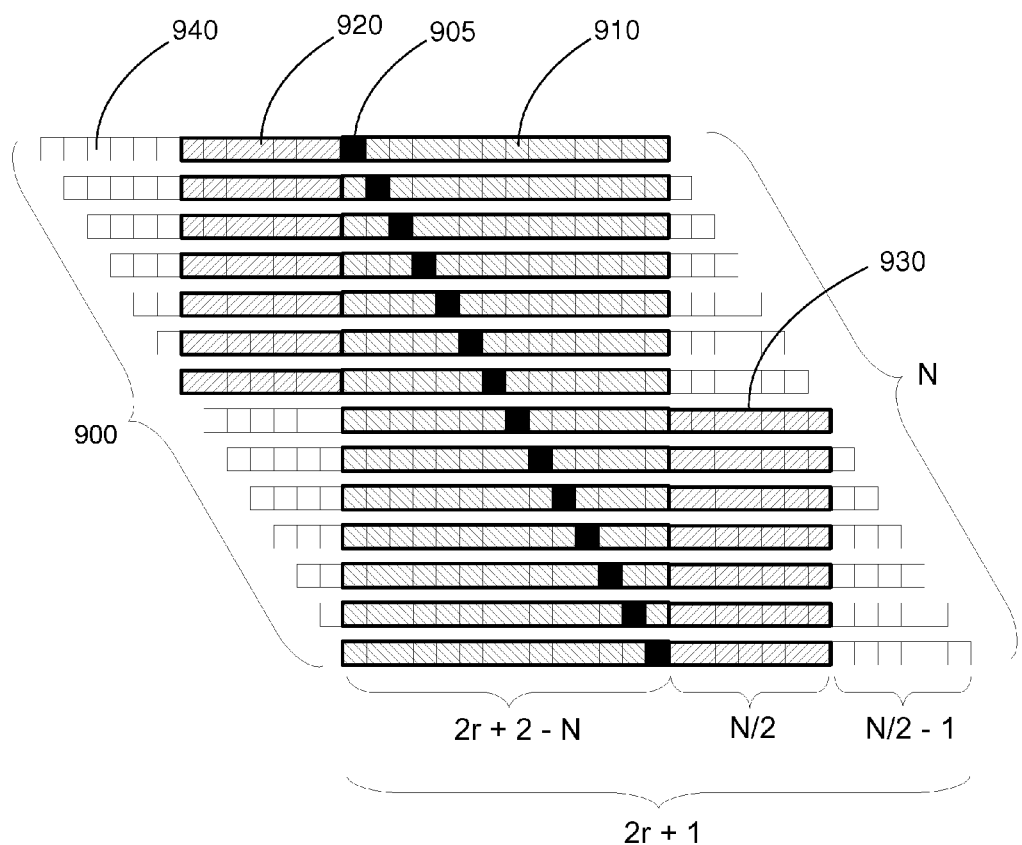
FIG. 9 illustrates a process used to derive histograms for a plurality of pixels in parallel.
Figure 10:
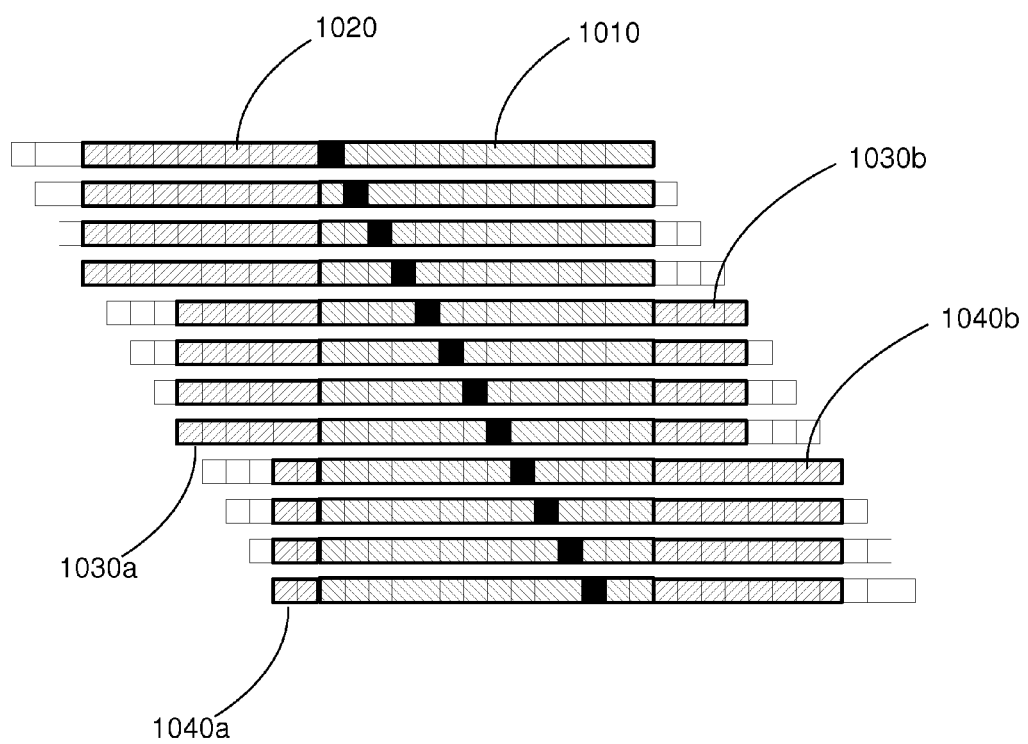
FIG. 10 illustrates a process used to derive histograms for a plurality of pixels in parallel.

As shown in FIG. 16, base neighborhood 1600 is 2r+1 pixels wide. The width of the N−1 additional regions 1630 varies from 2 pixels for the neighborhoods for the pixels immediately adjacent (on either side) to central pixel 1605, to N−1 for the pixels furthest away from central pixel 1605. If N is an odd integer (which is the typical case), the average width of each additional region 1630 is (2+(N−1))/2=(N+1)/2. The average number of histogram adjustments per pixel for moving the set of neighborhoods 1600 and 1610 one pixel downwards (which requires adding a row of pixels to the bottom of each neighborhood and subtracting a row of pixels from the top of each neighborhood, as described with respect to FIG. 3) is therefore:

$$A = 2[(N-1)(N+1)/2 + 2r + 1]/N = (N^2 + 4r + 1)/N$$

Solving for the N that minimizes the number of average histogram adjustments yields N=SQRT(4r+1). Plugging this value of N into the equation for the average number of histogram adjustments yields:

$$A_{min} = 2SQRT(4r+1)$$

The process of FIG. 16 thus requires on the order of SQRT(r) operations per pixel to derive the histogram for that pixel. The extraction of the median from the histogram remains constant regardless of r (because the number of elements ("buckets") in a histogram remain the same). Accordingly, using the process of FIG. 16 for applying a median filter requires a processing time on the order of the SQRT(r).

Figure 17:
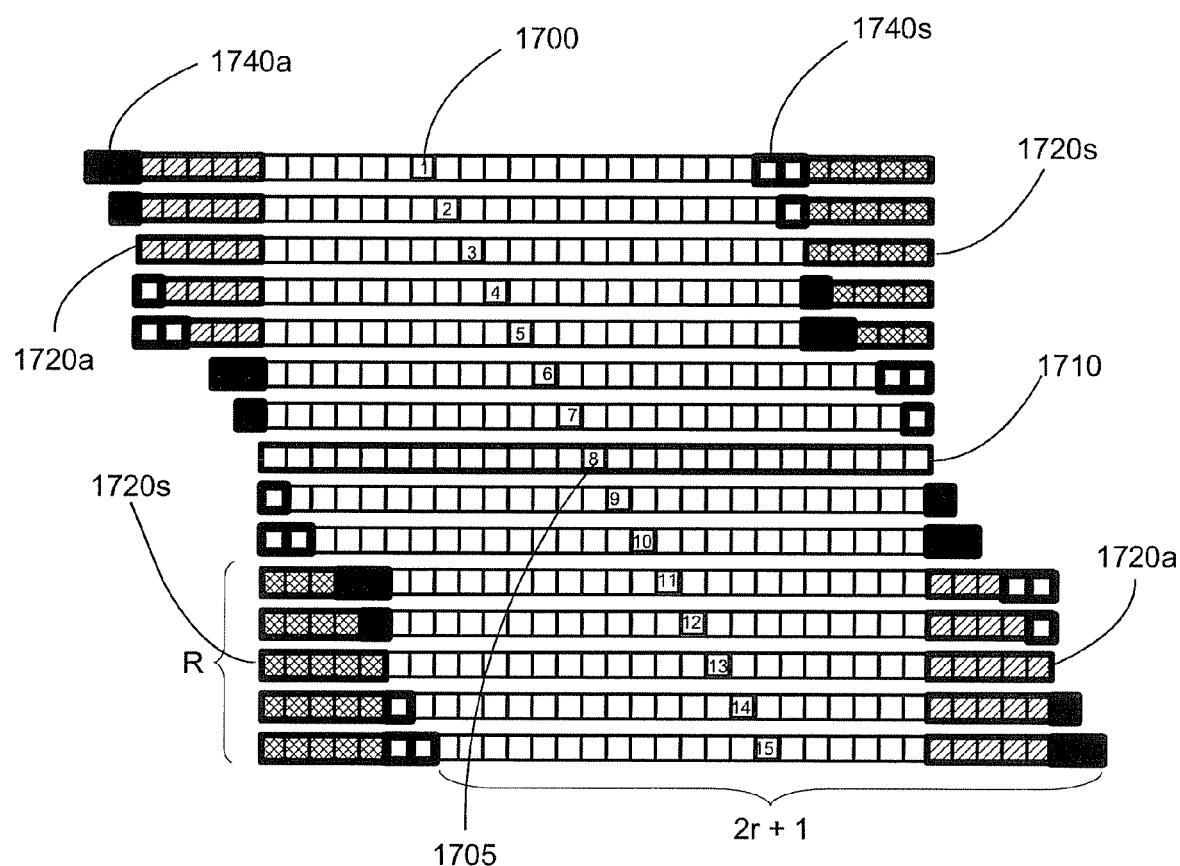
FIG. 17 illustrates a process used to derive histograms for a plurality of pixels in parallel.

For r sizes greater than a few pixels, further reductions in processing time may be achieved by using a multi-tiered implementation of the process of FIG. 16. FIG. 17 shows a "side" view of a multi-tiered method for deriving histograms using the additional and subtractive regions of the present invention. In the embodiment of FIG. 17, there are three tiers (T=3) of regions that are combined to obtain corresponding neighborhoods of radius r for each pixel 1700 in a set of N adjacent pixels 1700. In the example of FIG. 17, r=13 and N=15. Pixels 1700 are numbered 1 to 15 for ease of reference to neighborhoods for particular pixels.

The first tier comprises base neighborhood 1710 of central pixel 1705 (Pixel 8). The second tier comprises intermediate additional regions, such as intermediate additional regions 1720 of FIG. 17, which each comprise an additive region 1720a and a subtractive region 1720s. An intermediate additional region 1720 corresponds to the additional region that would apply to the pixel with which the intermediate additional region is associated (e.g. Pixels 3 and 13 for the two intermediate additional regions in the example embodiment of FIG. 17) in a single tiered implementation (e.g. additional regions 1630 of FIG. 16). The third tier comprises individual additional regions, such as individual additional region 1740, comprising additive region 1740a and subtractive region 1740s.

Figure 18:
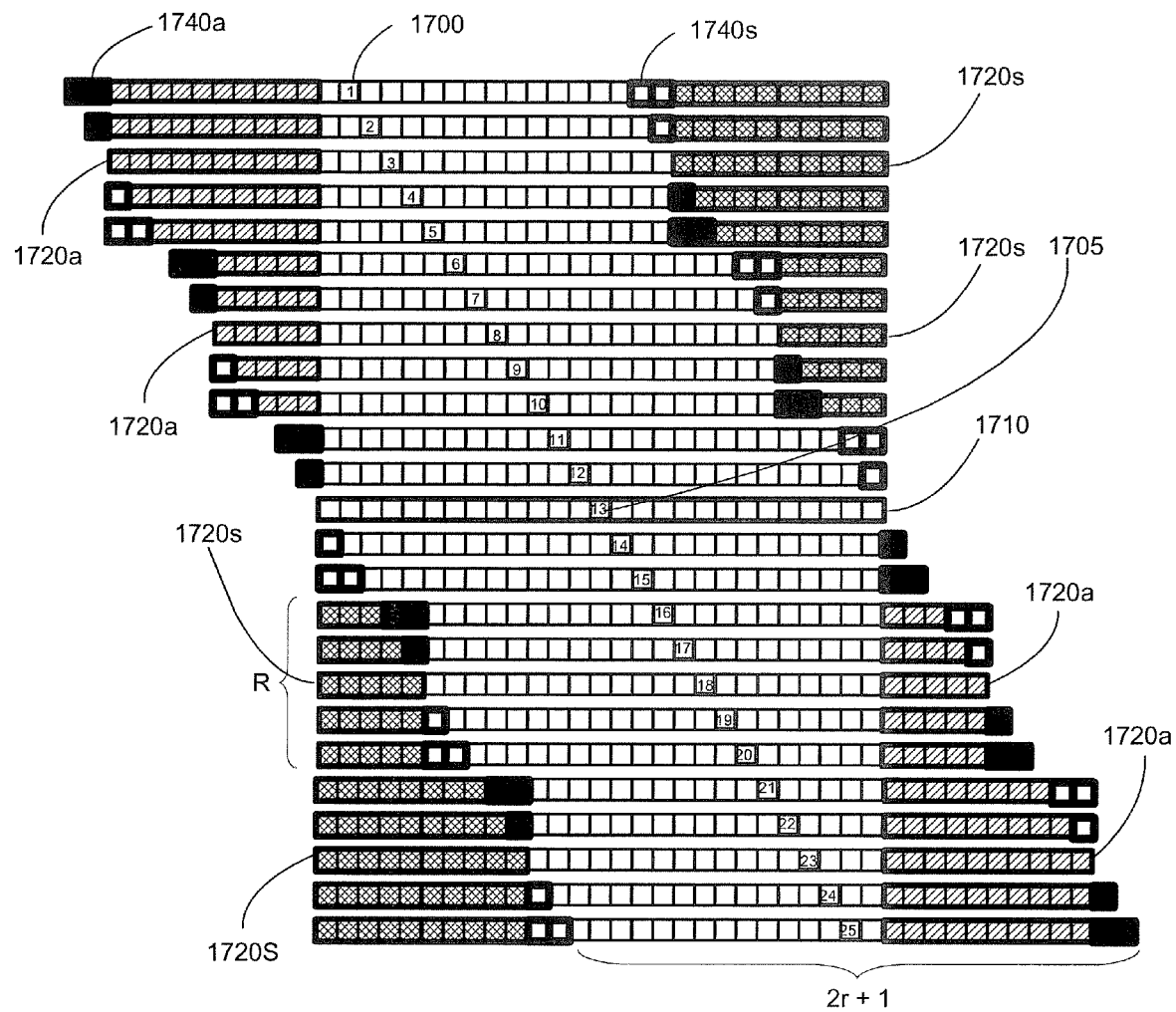
FIG. 18 illustrates a process used to derive histograms for a plurality of pixels in parallel.

Each intermediate additional region is used with a set of R pixels centered on the pixel to which the intermediate additional region corresponds. For example, in the embodiment illustrated in FIG. 17, the intermediate additional region associated with Pixel 13 is used with five pixels, namely Pixels 11, 12, 13, 14 and 15. In the embodiment of FIG. 17, R (also referred to sometimes as the "tier radix") is accordingly equal to 5. The number of intermediate additional regions ("I") depends on N and R. For example, I may be determined by the equation I=N/R−1. FIG. 18 shows an example in which N is 25, R is 5, and I is 4.

In a three-tiered implementation such as that of FIG. 17, there are three categories of neighborhoods. The first category is base neighborhood 1710, which is only made up of itself. The second category are the neighborhoods for the pixels corresponding to the intermediate additional regions 1720, which comprise the combination of base neighborhood 1710 and the applicable additional intermediate region 1720. The third category are the neighborhoods for all other pixels, which comprise the combination of base neighborhood 1710, the applicable intermediate additional region 1720, and the applicable individual additional region 1740.

Using the distributive property of histograms, the histogram for the neighborhood of a pixel can be derived from the histograms of the base neighborhood, the histogram for the applicable intermediate additional region (if any), and the histogram for the applicable individual additional region (if any). In the embodiments of FIGS. 17 and 18, to process a column of N adjacent pixels at once, a set of N histograms ("H*") needs to be maintained in memory at a time. These include: (a) 1 base histogram for base neighborhood 1710; (b) I intermediate histograms for the I intermediate additional regions 1720; and (c) (N−1−I) individual histograms for the remaining individual neighborhoods 1740.

In one or more embodiments of a three-tiered arrangement such as those of FIGS. 17 and 18, the number of histogram operations required per pixel depends on the number of pixels that need to be added to the set of N histograms for traversing the image one pixel down the column of N pixels being processed in parallel. The number of pixels that need to be added to each histogram depends on the width of the region to which the histogram pertains.

The widths of each of the three region types in the embodiment of FIG. 18 are shown in Table 3.

TABLE 3

Widths for Regions of FIG. 18

| Region Type | Width/Avg. Width | No. of Such Regions |
|---|---|---|
| Base Neighborhood 1700 | 2r + 1 | 1 |
| Intermediate Additional Neighborhood 1720 | R(1 + I/2) | I |
| Individual Additional Neighborhood 1740 | (R + 1)/2 | N − 1 − I |

In an embodiment in which I=N/R−1, the widths of Table 3 can be expressed in terms of N, r and R as shown in Table 4:

TABLE 4

Widths for Regions of FIG. 18 when I = N/R − 1

| Region Type | Width/Avg. Width | No. of Such Regions |
|---|---|---|
| Base Neighborhood 1700 | 2r + 1 | 1 |
| Intermediate Additional Neighborhood 1720 | (R + N)/2 | N/R − 1 |
| Individual Additional Neighborhood 1740 | (R + 1)/2 | N − N/R |

Using the average widths for and number of regions from Table 4, the average number of histogram operations per pixel can be expressed as:

$$A=(2/N)[(2r+1)+(1/2)(R+N)(N/R-1)+(1/2)(R+1)(N-N/R)$$

If R=SQRT(N), as in the embodiment of FIG. 18, the average number of histogram operations per pixel can be simplified to:

$$A=(4r+2)/N+2SQRT(N)-2/SQRT(N)$$

In one or more embodiments, solving for optimal N yields N approximately equal to $4r^{2/3}$, resulting in an operational runtime on the order of $r^{1/3}$.

The three tiered approach of FIGS. 17 and 18 can be extended into any number of tiers "T", although three tiers (T=3) are satisfactory for many applications. In one embodiment, a radius r median filter can be computed across N=O(r) ("order of r") columns at once, using N histograms arranged into T=O(log r) tiers of constant radix. In one embodiment, a radius one-million median filter can be computed across N=531,441 columns at once, using 531,441 histograms representing 531,441 neighborhoods arranged into seven tiers of radix 7, occupying roughly 500 megabytes of storage (for an 8-bit image). Adding one row of pixels to the histograms requires approximately 114 histogram operations per pixel. Extracting the median from each histogram takes on the order of log(r) steps (requiring splicing together up to seven histograms, one for each tier). In one or more embodiments, the overall computational cost per pixel is on the order of log(r).

The histogram derivation method of the present invention, and the median filter using the histogram derivation method, may be implemented in computer software using computer programming methods as are known to those of skill in the art. An example of pseudocode for a software implementation of an embodiment of a median filter utilizing the method of the invention is set forth below:

```
let:
    r = radius of median filter
    H* = set of histograms used to process N columns of pixels
    H_col = the histogram for a particular column, derived from H*
    I = input image, N + 2r pixels square
    O = output image, N pixels square
    for each row in [0 .. 2r]: //Initialize H*
        add row, I[row][0 .. 2r + N - 1] to H*
    for each output pixel in O[0][col]: // compute first N median values
        scan H_col to find the median m,
        write o[0][col] = m.
    for row = 1 to N - 1: //step from top to bottom of image
        add new bottom row, I[row + 2r][0 .. 2r + N - 1], to H*.
        subtract old top row, I[row - 1][0 .. 2r + N - 1], from H*.
        find N new median values in H*; write to o[row][0 .. N - 1].
```

The size of a histogram (i.e. the number of elements or "buckets") depends on the number of values that a pixel may have in the image that is being processed. In the example of FIG. 14, for example, there were 16 possible values for a pixel. Hence the histograms of FIG. 14 had sixteen elements. For 8-bit images, a pixel may have 256 values per channel (i.e. R, G, and B). 16-bit images have 65,536 (64K) values per channel. Using the method of the present invention for 8-bit images requires histograms with 256 elements. 16-bit images require histograms with 65,536 elements.

The number of steps required to scan a histogram to extract the median value depends on the size of the histogram. For a 256 element histogram as used for 8-bit images, an average of 128 steps is required to scan each histogram, starting from zero, to find the median value.

In one or more embodiments of the invention, the average histogram scanning time is reduced by using the median output values for a previous row of pixels to calculate starting points from which to begin scanning the histograms for the next row of pixels. These starting points are generally closer to the median than the "zero" valued element of the histogram, so that scanning time can be significantly reduced.

In one or more embodiments, the median value of sub-columns within the set of pixel columns that are being processed is used to determine the starting points for the histograms for the pixels in the sub-column. For example, if N columns are being processed simultaneously, "S" sub-columns can be used. In one or more embodiments, S is selected to be on the order of log(N). In an example embodiment in which N=100, S is selected to be 5, such that there are 5 sub-columns each 20 pixels in width.

Figure 20:
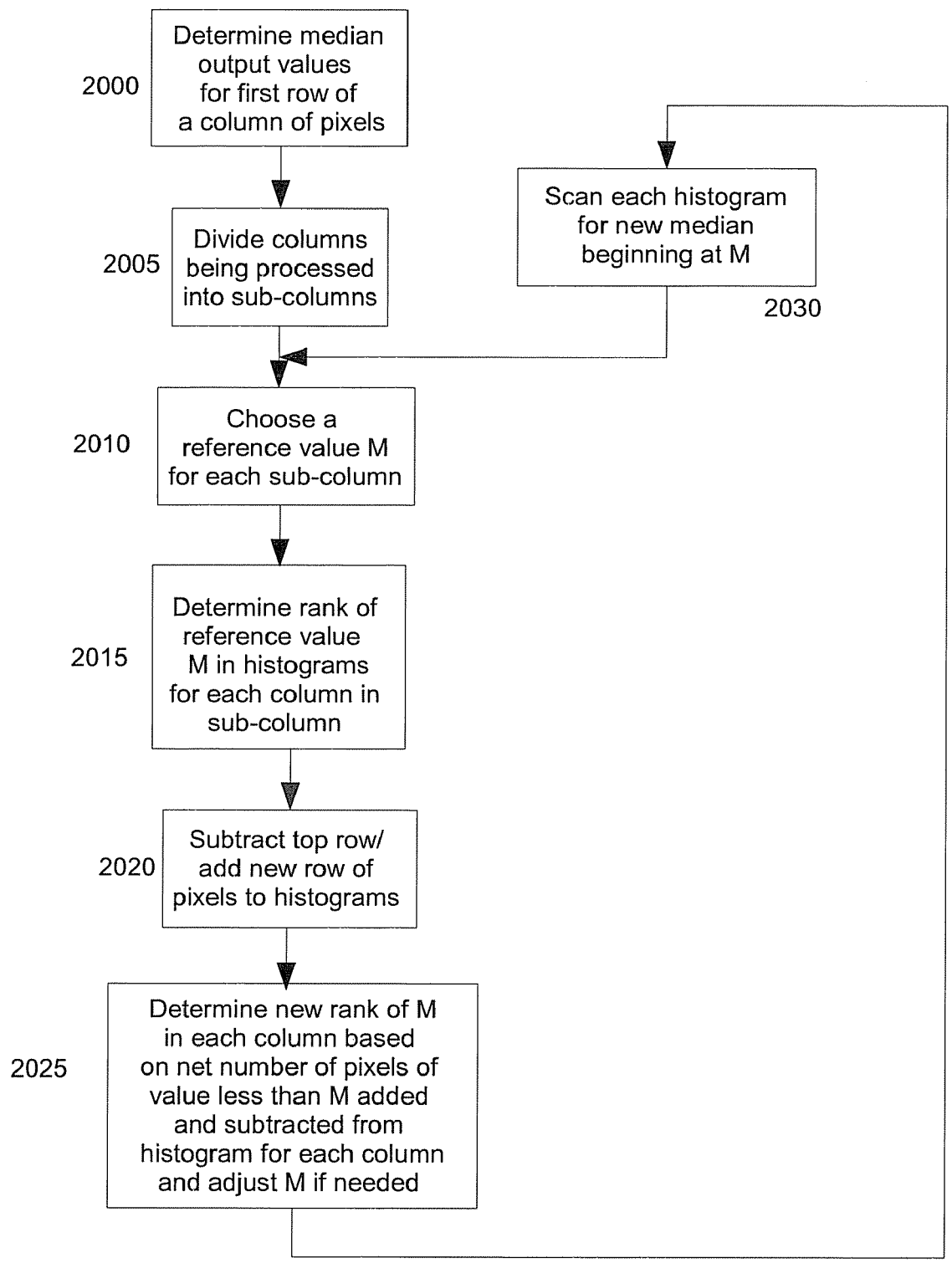
FIG. 20 illustrates a process used to scan histograms for rank order values.

FIG. 20 illustrates a process used to determine a starting median value for processing pixels in sub-columns in one or more embodiments of the invention. At step 2000, the output median values for a first row of a column of pixel values is determined, for example using embodiments of the invention. At step 2005, the column is divided into sub-columns. At step 2010, a reference value "M" for each sub-column is selected. In one or more embodiments, reference value M (also sometimes referred to as a "pivot") is selected based on the median output values for the most recently processed row of input pixels in the sub-column, such as, for example, the median values determined at step 2000.

In one or more embodiments, the reference value M is selected to be the minimum value of the median output values for the respective input pixels in the sub-column, rounded down to a multiple of the number eight (8). The reference value M need not be any actual median output value of any input pixel, however, but can be any value that roughly tracks or approximates the median output values for the input pixels in a sub-column.

At step 2015, the rank of the current representative value M in each of the histograms for each sub-column is determined, for example by determining the number of pixels V in each histogram whose value is less than M. At step 2020, the next row of pixels is processed by subtracting the top row of pixels from and adding the next row of pixels to the histograms for each of the columns in a sub- column. While doing so, the number of pixels with value less than M added and removed from each histogram is tracked.

At step 2025, the rank of representative value M in the histograms for each of the columns in the sub-column is determined from the net number of pixels with value less than M that were added or subtracted in step 2020. For example, in one or more embodiments, a value of "1" is assigned to every pixel value less than M in the row being added, and a value of "0" to the other pixels in the row. Similarly, for the row being subtracted, a value of "−1" is assigned to every pixel value less than M and a value of "0" to the other pixels in the row. A horizontal box filter is used to sum the values for the subtracted and added rows applicable to the histogram for each column, and the new rank of M in the new histograms is found by adding the sum for a column to the rank of M in the histogram for that column.

In one or more embodiments, M may be adjusted if the new rank for M determined at step 2025 does not meet some predetermined criteria. For example, in one or more embodiments, the criteria that is used is that the rank of M be lower than the median rank for all columns in a sub-column. For example, if 8-bit histogram values are used, the rank of M for all columns must be less than 128. If the rank of M does not meet the predetermined criteria, an adjustment may be made to M. For example, in one or more embodiments, if the rank of M in any column is above the median rank, M is reduced by some incremental amount, for example by 8. The rank of the new, reduced M is determined by walking down 8 elements in each histogram from the previous rank of M. This process is iterated until the criteria for M is met. In one or more embodiments, if the rank of M is already lower that the median rank for each column, the M is adjusted incrementally upwards (in a manner analogous to the describe downward adjustment) until the highest value of M is found that is lower than the lowest median for any of the columns in the sub-column.

At step 2030, each updated histogram is scanned for its median value beginning at starting point M, either upwards or downwards depending on the rank of M in the histogram for a particular column. After the median values for the new row of pixels are determined at step 2030, the process returns to step 2010, using the median values determined at step 2030 to choose a new reference value at step 2010.

As the size of histograms increase, storage of histograms in memory, especially for large values or r and N, becomes an issue. In one or more embodiments, an "ordinal transform" of an input image is utilized to reduce the size and storage requirements of the histograms used.

FIG. 19 shows an example of a sample input image 1900 and its ordinal transform 1910. To derive the ordinal transform, the pixels in the input image are sorted, and each pixel is mapped its ordinal value, from 0 for the lowest valued pixel in the image, to P–1 for the highest valued pixel, where "P" is the number of pixels in the image. Duplicate valued pixels are assigned consecutive ordinal values, such that each pixel in the transformed image has a unique value, as shown in FIG. 19. After the ordinal transfer is applied to the image, the median filtering process proceeds as described above, using single-bit histograms, each of which has the same number of elements as the number of pixels in the input image (because each pixel is assigned a unique ordinal value, the number of possible values is equal to the number of pixels). Single-bit histograms are sufficient because each ordinal value is unique in an image, such that each histogram can contain at most 1 pixel of each ordinal value. The median filtered ordinal image is then transformed using the inverse of the original ordinal mapping to produce the median filtered output image.

Because histogram elements in the set of histograms H* can be negative, it may at first appear that using single-bit histograms may be problematic, because the possible value range [–1, 0, 1] exceeds the capacity of a single bit. However, because the value for each element of the histograms for the neighborhoods of each input pixel that are derived from the histograms in He can have values of only zero or one, only the lowest bit for each element of each histograms that are being summed need participate in the summation. Therefore a single bit is sufficient for the elements of the histograms in H*, and the combining of histograms for each neighborhood can be accomplished through a bitwise XOR of the histograms being combined. Put another way, for every –1 value in one of the histograms being summed, there must be at least one matching +1 value in one of the other histograms taking part in the summation, because the end result can only be 0 or 1. So using 1 to represent either +1 or –1 in the histograms being summed, and doing a bitwise XOR obtains the correct result: an even total number of 1's in the set being summed means that there each –1 has been cancelled out by a +1, making the end sum zero, while an odd total number can only mean that there is one more +1 than the minus –1's, making the end sum 1.

For processing N columns of pixels in parallel, using, for example, the process described with respect to FIGS. 17 and 18, the ordinal transform process of the invention requires the allocation and maintenance of N single-bit histograms in memory. The uniqueness of the values in the ordinal transformed image (the "ordinal image"), however, allows the use of an alternative method of determining the histograms for each of N pixels being processed that provides additional efficiencies over the multi-tiered process of FIGS. 17 and 18.

The general goal is to find as efficient way as possible of deriving the single-bit (i.e. "binary") histograms for the neighborhoods of each of the pixels being processed. Let $B_n$ refer to the binary histogram for a particular neighborhood n. Because each pixel has been assigned a unique pixel value, each pixel will have its own element or "bucket" in $B_n$. Accordingly, all of the elements in $B_n$ that have a value of "1" will correspond to input image pixels that fall in that particular neighborhood n. All elements in $B_n$ that have a value of "0" correspond to input image pixels that are not located in neighborhood n. Accordingly, if one knows which input image pixels fall within neighborhood n, $B_n$ can be determined directly from that information.

Figure 21:
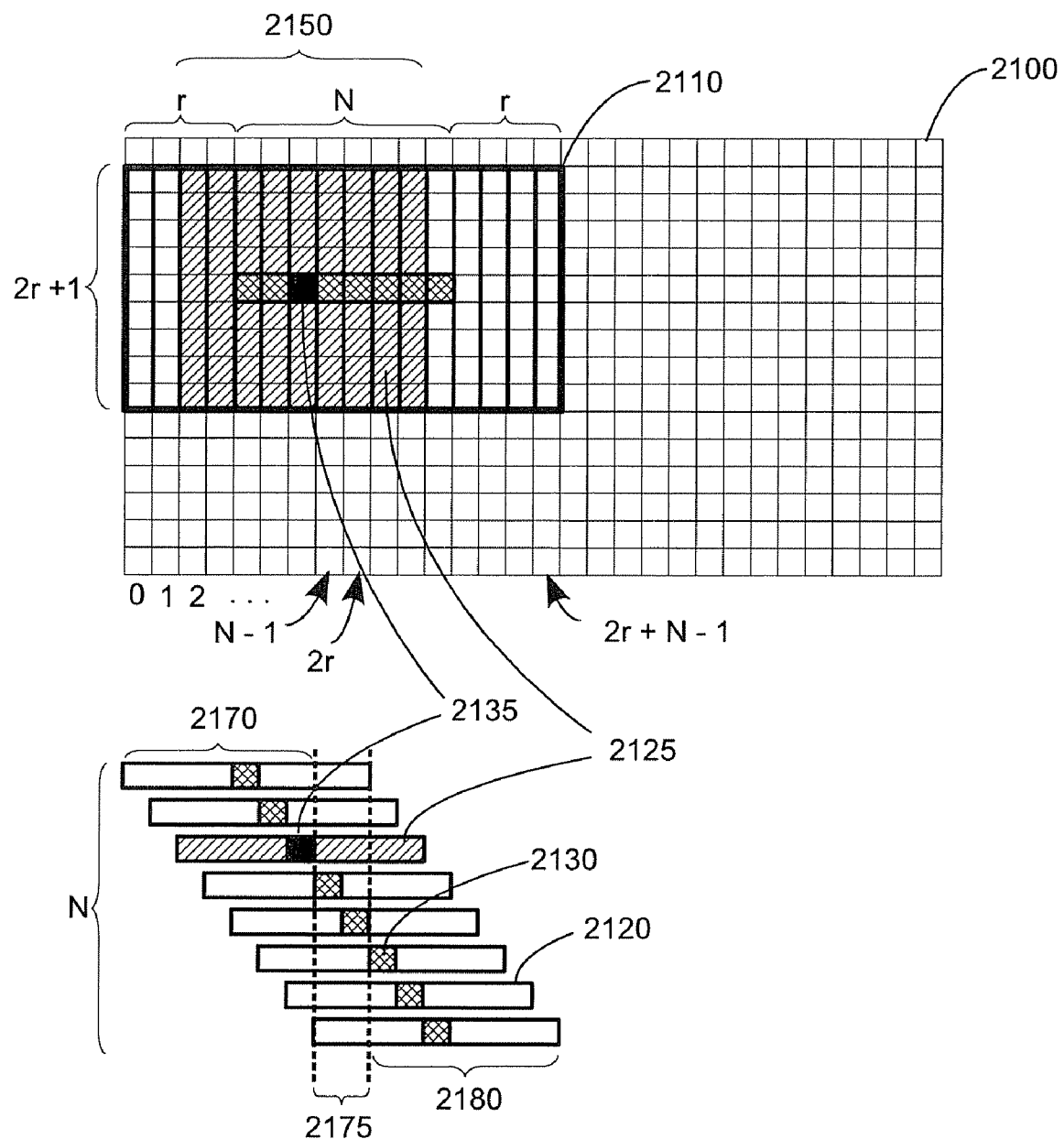
FIG. 21 illustrates a process used to derive histograms for a plurality of pixels in parallel utilizing a compound histogram.

For processing N pixels in parallel using a square neighborhood of radius r, the part of the image from which the histograms for each row of N pixels being processed is a rectangle of height 2r+1 and width 2r+N. An example of such an "active area" 2110 of an example image 2100 is illustrated in FIG. 21. Active area 2100 comprises the set of pixels that populate the N neighborhoods 2120 of N pixels 2130, as shown in the "side" view of neighborhoods 2120 in FIG. 21.

In one or more embodiments of the invention, instead of creating N binary histograms (one for the each of the N regions from which the neighborhoods of each of the N pixels that are being processed in parallel are formed, as described, for example, with respect to FIGS. 17 and 18), a "compound histogram" $H^c$ is constructed for the "active area" of the image that includes location information for each pixel (e.g. the column in which the pixel is located). By including such location information in $H^c$, the histograms $B_n$ for each of the N input pixels can be directly computed.

In one or more embodiments, the compound histogram $H^c$ is initialized by adding pixels of the active area row by row to $H^c$. $H^c$ has an element ("bucket") for each of the ordinal values of the pixels in the input image. Thus, for each ordinal pixel value "v", there is a corresponding histogram element $H^c[v]$. Once complete, each $H^c[v]$ corresponding to a pixel that is located in the active area will have a non-zero value, while all other $H^c[v]$, corresponding to pixels that are outside the active area, will have the value of zero.

In the case of a binary histogram, the value that is entered in the histogram element corresponding to a pixel located in the active area would be the value "1." In the case of a compound histogram, instead of entering the value "1" into each histogram element corresponding to a pixel in the active area, a value is entered that contains information about the column location of the pixel within the active area. The $B_n$ for each neighborhood n can then be obtained by extracting the pixel elements whose column location is in the 2r+1 columns that are spanned by neighborhood n (e.g. columns 2150 for neighborhood 2125 of pixel 2135 in FIG. 21). If the columns ("col") in an active region are numbered from col=0 to 2r+N–1, and the neighborhoods are numbered from n=1 to N, the columns in any neighborhood n are n–1<=col<=2r+N. For N<=2r+1 (which will typically be the case), as shown in FIG. 21, there will be an overlap area 2175 of width 2r+2–N comprising the columns for which N–1<=col<=2r in which the pixels belong to all neighborhoods n.

In one or more embodiments of the invention, an eight-bit value is used for each histogram element. The value that is entered for each pixel in the active area is determined as follows:

For each pixel value "v" for a pixel located in column "col" of the active area (with col=0 to 2r+N−1):

$$H^c[v] = \text{0xFF−col if col<N−1} \quad (1)$$

$$H^c[v] = \text{0x80 if N−1<=col<=2r} \quad (2)$$

$$H^c[v] = \text{0x80−(col−2r) if col>2r} \quad (3)$$

The first set of values, 0xFF−col, is used for pixels that fall in the first group of columns, from column "0" to column "N−2" (such as range 2170 in FIG. 21). The values assigned to the corresponding histogram element $H^c[v]$ for pixels in this range of columns ranges from 0xFF−N+2 (for col=N−2) to 0xFF (for col=0), or, in decimal values, from 257−N to 255.

The second value, 0x80 (decimal value 128), is assigned to pixels in the overlapping columns from col=N−1 to col=2r that are shared by all neighborhoods n (such as overlapping columns 2175 of FIG. 21).

The third set of values, 0x80−(col−2r) is used for pixels that fall in the final group of columns, from col=2r+1 to col=2r+N−1 (such as range 2180 in FIG. 21). The values assigned to the corresponding histogram element $H^c[v]$ for pixels in this range of columns ranges from 0x81−N (for col=2r+N−1) to 0x7F (for col=2r+1) to, or, in decimal values, from 129−N to 127.

It will be noted that in this embodiment, N must be less than or equal to the lesser of 2r and 128 to ensure that each column will correspond to a unique histogram value. Larger N can be accommodated if a larger than 8-bit histogram is used. For example, in one or more embodiments in which a 16-bit histogram is used, N can range up to 32768.

Using the above set of 8-bit histogram values for the embodiment of FIG. 21 (in which r=4 and N=8), the histogram values assigned to the pixels in columns 0, 1, 2, 3, 4, 5, and 6 are 0xFF, 0xFE, 0xFD, 0xFC, 0xFB, 0xFA, and 0xF9 (255, 254, 253, 252, 251, 250 and 249) respectively. The histogram value assigned to the pixels in columns 7 and 8 is 0x80 (128). The histogram values assigned to the pixels in columns 9, 10, 11, 12, 13, 14 and 15 are 0x7F, 0x7E, 0x7D, 0x7C, 0x7B, 0x7A, and 0x79 (127, 126, 125, 124, 123, 122 and 121) respectively.

Once the compound histogram $H^c$ has been generated for a row of pixels, the binary histograms $B_n$ for each neighborhood can be computed using 8-bit modular arithmetic in constant time as:

$$B_n[v] = (H^c[v] + n) >> 7$$

The median for each neighborhood n can then be extracted in the normal manner. To process the next row of input pixels, the compound histogram elements corresponding to the pixels in the top row of the active area are zeroed, and the pixels in the next row are added to the compound histogram using the same three sets of histogram values. The binary histograms are computed from the updated compound histogram, and processing proceeds in the same manner from row to row until all input pixels have been processed.

Figure 22:
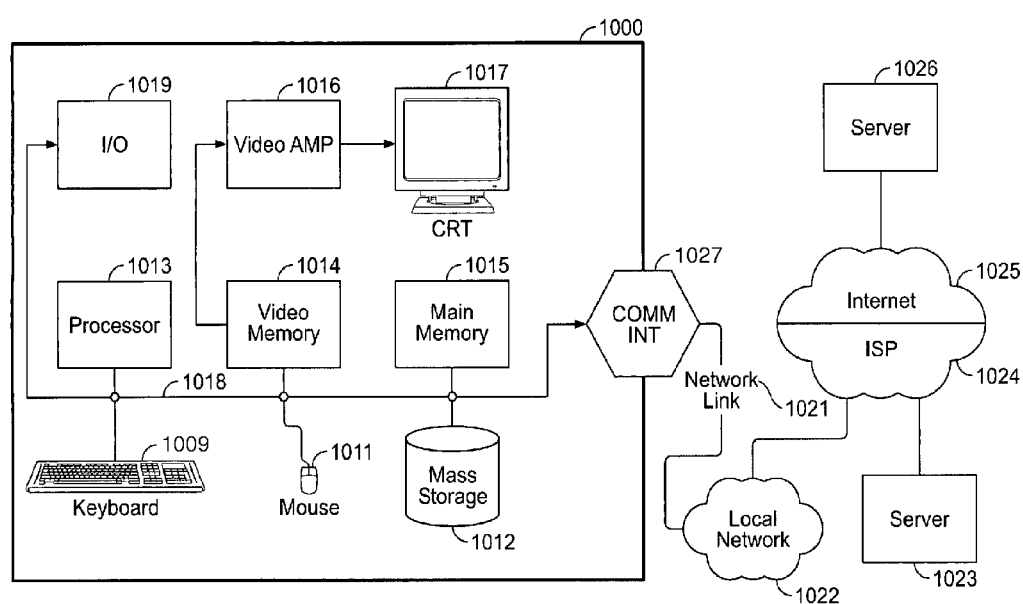
FIG. 22 illustrates a general purpose hardware environment used in accordance with one embodiment of the invention.

Embodiment of General Purpose Computer Environment:

An embodiment of the invention can be implemented as computer software in the form of computer readable program code executed on one or more general-purpose computers, such as the computer 1000, illustrated in FIG. 22. A keyboard 1009 and mouse 1011 are coupled to a bi-directional system bus 1018 (e.g., PCI, ISA or other similar architecture). The keyboard and mouse are for introducing user input to the computer system and communicating that user input to central processing unit (CPU) 1013. Other suitable input devices may be used in addition to, or in place of, the mouse 1011 and keyboard 1009. I/O (input/output) unit 1019 coupled to bi-directional system bus 1018 represents possible output devices such as a printer or an A/V (audio/video) device.

Computer 1000 includes video memory 1014, main memory 1015, mass storage 1012, and communication interface 1027. All these devices are coupled to a bi-directional system bus 1018 along with keyboard 1009, mouse 1011 and CPU 1013. The mass storage 1012 may include both fixed and removable media, such as magnetic, optical or magnetic optical storage systems or any other available mass storage technology. The system bus 1018 provides a means for addressing video memory 1014 or main memory 1015. The system bus 1018 also provides a mechanism for the CPU to transfer data between and among the components, such as main memory 1015, video memory 1014 and mass storage 1012.

In one embodiment of the invention, the CPU 1013 is a microprocessor manufactured by Motorola, such as the 680.times.0 processor, an Intel Pentium class processor, or an UltraSparc class processor from Sun Microsystems. However, any other suitable processor or computer may be utilized. Video memory 1014 is a dual ported video random access memory. One port of the video memory 1014 is coupled to video accelerator 1016. The video accelerator device 1016 is used to drive a CRT (cathode ray tube), and LCD (Liquid Crystal Display), or TFT (Thin-Film Transistor) monitor 1017. The video accelerator 1016 is well known in the art and may be implemented by any suitable apparatus. This circuitry converts pixel data stored in video memory 1014 to a signal suitable for use by monitor 1017. The monitor 1017 is a type of monitor suitable for displaying graphic images.

The computer 1000 may also include a communication interface 1027 coupled to the system bus 1018. The communication interface 1027 provides a two-way data communication coupling via a network link 1021 to a network 1022. For example, if the communication interface 1027 is a modem, the communication interface 1027 provides a data communication connection to a corresponding type of telephone line, which comprises part of a network link 1021. If the communication interface 1027 is a Network Interface Card (NIC), communication interface 1027 provides a data communication connection via a network link 1021 to a compatible network. Physical network links can include Ethernet, wireless, fiber optic, and cable television type links. In any such implementation, communication interface 1027 sends and receives electrical, electromagnetic or optical signals that carry digital data streams representing various types of information.

The network link 1021 typically provides data communication through one or more networks to other data devices. For example, network link 1021 may provide a connection through local network 1022 to a host computer 1023 or to data equipment operated by an Internet Service Provider (ISP) 1024. ISP 1024 in turn provides data communication services through the worldwide packet data communication network now commonly referred to as the "Internet" 1025. Local network 1022 and Internet 1025 both use electrical, electromagnetic or optical signals that carry digital data streams to files. The signals through the various networks and the signals on network link 1021 and through communication interface 1027, which carry the digital data to and from computer 1000, are exemplary forms of carrier waves for transporting the digital information.

The computer 1000 can send messages and receive data, including program code, through the network(s), network link 1021, and communication interface 1027. In the Internet example, server 1026 might transmit a requested code for an application program through Internet 1025, ISP 1024, local network 1022 and communication interface 1027.

In one embodiment of the invention a thin-client device is configured to interface with the computer system described above via a computer network. In other instances (e.g., when a smart mobile device is utilized) some or all of the components discussed above are incorporated into the device. It will be evident to one of ordinary skill in the art that the computer systems described above are for purposes of example only. An embodiment of the invention may be implemented in any type of computer system or programming or processing environment.

Thus, a novel method and system for deriving and applying histograms for use in processing of digital images has been presented. It will be understood that the above described embodiments are merely illustrative, and modifications may be made without departing from the scope of the invention as defined in the claims. For example, although embodiments have been described utilizing a square neighborhood ("kernel") for determining the median filtered value of a pixel, the other types and shapes of kernels, such as circular approximations, can be used. Although embodiments have been described for using the present invention for extracting the median value of histograms for applying a median filter to an image, the invention may also be used to implement other types of rank order filters by extracting a different rank order value than the median value from the histograms. Other embodiments of the invention will be apparent to those of skill in the art from the description and disclosure of the invention herein, all of which are encompassed within the scope of the instant claims.

The invention claimed is:

1. A method for converting one or more pixels of an input digital image into one or more pixels of an output digital image using a computer comprising a processor and memory comprising the steps of:
    determining a first histogram of pixel values for pixels in a first region of said input digital image using said processor and storing said first histogram in said memory;
    determining a second histogram of pixel values for pixels in a second region of said digital input image using said processor and storing said second histogram in said memory, said second region comprising an additive region adjacent to said first region for which a positive value is added to said second histogram for each pixel in said additive region and a subtractive region that coincides with a portion of said first region for which a negative value is added to said second histogram stored in said memory for each pixel in said subtractive region;
    deriving a third histogram of pixel values for pixels in a third region of said digital input image by combining said first and second histograms using said processor and storing said third histogram in said memory;
    extracting a rank order pixel value from said third histogram stored in said memory using said processor;
    creating an output pixel of said output digital image comprising said extracted rank order pixel value using said processor and storing said output pixel in said memory.

2. A method for converting one or more pixels of an input digital image into one or more pixels of an output digital image using a computer comprising a processor and memory comprising the steps of:
    converting said digital input image into a transformed digital image using said processor by applying an ordinal transform to said pixels of said digital input image and storing said transformed digital image in said memory;
    determining a first binary histogram of pixel values for pixels in a first region of said transformed image using said processor and storing said first binary histogram in said memory;
    determining a second binary histogram of pixel values for pixels in a second region of said transformed image using said processor and storing said second binary histogram in said memory;
    deriving a third binary histogram of pixel values for pixels in a third region of said transformed image by combining said first and second binary histograms using said processor and storing said third binary histogram in said memory;
    extracting a rank order pixel value from said third binary histogram stored in said memory using said processor;
    creating a pixel of said output digital image by applying an inverse ordinal transform to said extracted rank order pixel value using said processor and storing said created pixel in said memory.

3. A method for converting one or more pixels of an input digital image into one or more pixels of an output digital image using a computer comprising a processor and memory comprising the steps of:
    converting said digital input image into a transformed digital image using said processor by applying an ordinal transform to said pixels of said digital input image and storing said transformed digital image in said memory;
    determining a compound histogram for said transformed image comprising pixel value and pixel location information using said processor and storing said compound histogram in said memory;
    deriving a first binary histogram for pixel values for pixels in a first region of said transformed image from said compound histogram using said processor and storing said first binary histogram in said memory;
    extracting a rank order pixel value from said first binary histogram stored in said memory using said processor;
    creating a pixel of said output digital image by applying an inverse ordinal transform to said extracted rank order pixel value using said processor and storing said created pixel in said memory.

* * * * *